US012543129B2

(12) United States Patent
Shumaker et al.

(10) Patent No.: US 12,543,129 B2
(45) Date of Patent: Feb. 3, 2026

(54) EMPLOYING DITHERED CLOCK IN DISTRIBUTED RADIO SYSTEM

(71) Applicant: Intel Corporation, Santa Clara, CA (US)

(72) Inventors: Evgeny Shumaker, Nesher (IL); Elan Banin, Raanana (IL); Ofir Degani, Haifa (IL)

(73) Assignee: Intel Corporation, Santa Clara, CA (US)

( * ) Notice: Subject to any disclaimer, the term of this patent is extended or adjusted under 35 U.S.C. 154(b) by 690 days.

(21) Appl. No.: 17/841,907

(22) Filed: Jun. 16, 2022

(65) Prior Publication Data

US 2023/0413195 A1 Dec. 21, 2023

(51) Int. Cl.
*H04W 56/00* (2009.01)

(52) U.S. Cl.
CPC .................................. *H04W 56/001* (2013.01)

(58) Field of Classification Search
CPC .................................................... H04W 56/001
See application file for complete search history.

(56) References Cited

U.S. PATENT DOCUMENTS

2008/0307240 A1* 12/2008 Dahan ..................... G06F 1/324
713/320
2022/0408382 A1* 12/2022 Mysore ............... H04W 56/001

* cited by examiner

*Primary Examiner* — Kyaw Z Soe
(74) *Attorney, Agent, or Firm* — Schwegman Lundberg & Woessner, P.A.

(57) ABSTRACT

A radio-head apparatus can comprise memory to store dithering information of the apparatus. The radio-head can further include radio-head circuitry to generate a clock signal according to the dithering information and to provide a wakeup signal, subsequent to commencement of clock signal generation, to instruct a secondary RH to use the clock signal of the RH. The same wakeup signal is also used to synchronize the finite state machines of both RHs that govern and report the dithering information. Synchronization of the FSM allows estimation of information to be used in the secondary RH for compensation of the clock dithering applied in the primary RH. Other systems and apparatuses are described.

20 Claims, 19 Drawing Sheets

EMPLOYING DITHERED CLOCK IN DISTRIBUTED RADIO SYSTEM

TECHNICAL FIELD

Aspects of the disclosure pertain to radio frequency (RF) communications. More particularly, aspects relate to synchronization circuitry for RF communications.

BACKGROUND

Distributed radio systems hold the promise of revolutionizing the industrial design of a client system by allowing flexibility in radio frequency (RF) interface placement as well as unlocking millimeter-wave communication standards (where RF front-end/antenna proximity is necessary). Signals provided in such distributed radio systems need to be time- and phase-aligned to comply with regulatory standards.

BRIEF DESCRIPTION OF THE DRAWINGS

In the drawings, which are not necessarily drawn to scale, like numerals may describe similar components in different views. Like numerals having different letter suffixes may represent different instances of similar components. Some aspects are illustrated by way of example, and not limitation, in the figures of the accompanying drawings in which.

DETAILED DESCRIPTION

The following description and the drawings sufficiently illustrate specific aspects to enable those skilled in the art to practice them. Other aspects may incorporate structural, logical, electrical, process, and other changes. Portions and features of some aspects may be included in, or substituted for, those of other aspects. Aspects set forth in the claims encompass all available equivalents of those claims.

Distributed radio systems, or radio-heads (RHs) hold the promise of revolutionizing the industrial design of a client system by allowing flexibility in radio frequency (RF) interface placement as well as unlocking millimeter-wave communication standards that make use of close RF front-end/antenna proximity. In distributed radio systems, clock information must be transferred between RHs using remote clock signaling mechanisms. A high signal-to-noise ratio (SNR) should be maintained in at least these use cases, due to the ever-increasing spectral-purity/low-random-jitter needs of communications circuitry. However, the SNR in a wireline connection realization of clock transfer would be limited by radiated power limitations imposed by governmental electromagnetic interference (EMI) or radio frequency interference (RFI) regulations and standards.

Further lowering the radiation power density to comply with governmental standards can be achieved through frequency or phase modulation of the clock, referred to hereinafter as "dithering." However, RHs may not be able to take advantage of dithering without further abilities to account for the temporal shifting of clock edges that occurs with dithering.

Previous solutions provided remote clock signaling by transmission of a continuous wave clock signaling, or by providing a very slow dithering pattern on the transmitted clock signal frequency. However, these solutions may not provide adequate SNR and can narrow the eventual system bandwidth.

Aspects of the disclosure address these and other concerns by performing faster dithering, while providing the exact parameters of the dithering to any secondary clocks or RHs. Aspects provide a solution for synchronizing distributed radio transmitters with a dithered synchronization carrier/clock, without sacrificing phase information and without limiting dithering bandwidth, described below with respect to FIGS. 10A-17. The communication systems, devices, and other components providing dithered clocks are described in more detail with respect to FIG. 1-9.

Figure 1:
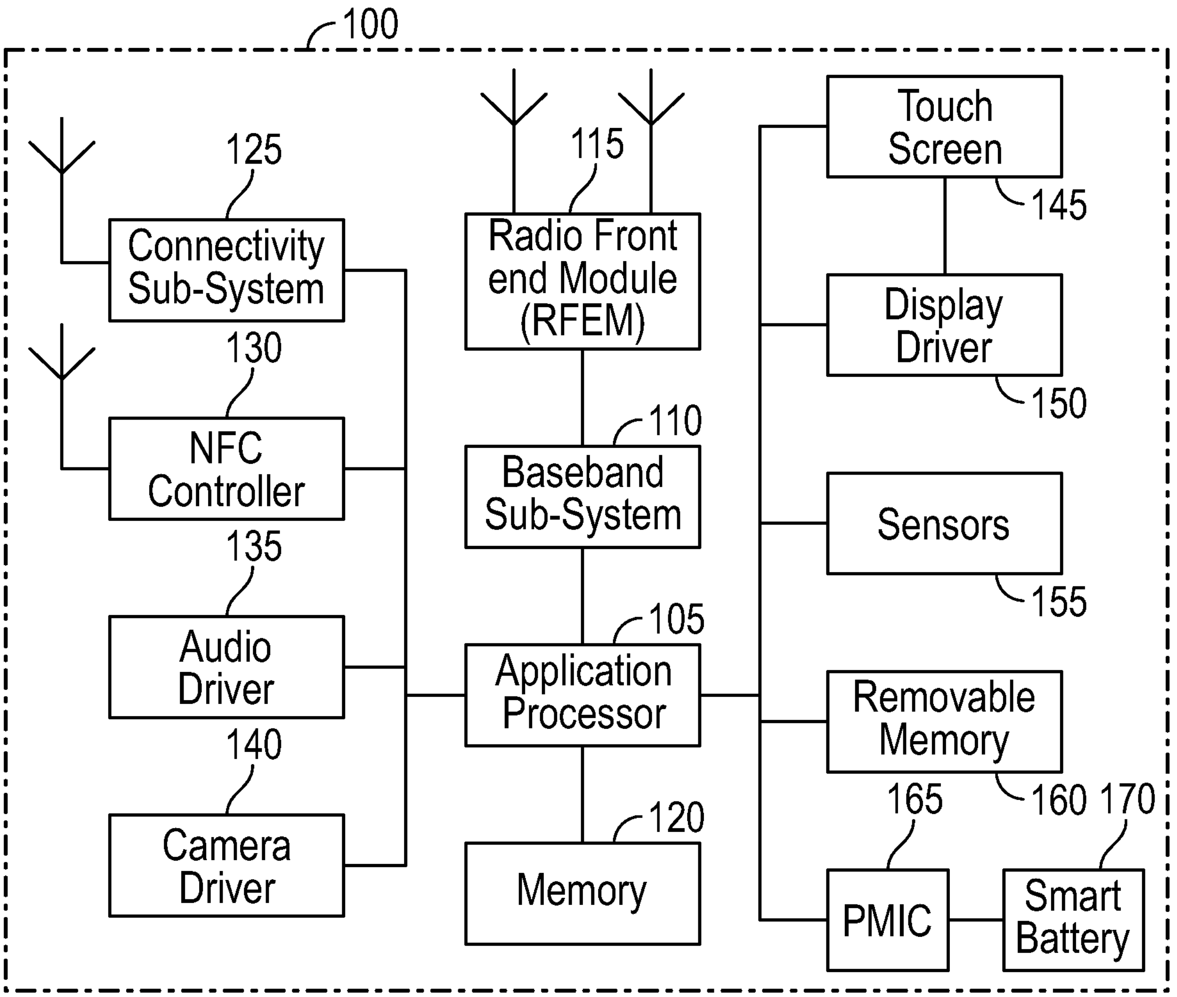
FIG. 1 illustrates an exemplary user device according to some aspects.

An integrated Radio-Frequency frontend module (FEM) is broadly used in the frontend circuits for cellular handsets or other wireless devices. FIG. 1 illustrates an exemplary user device according to some aspects. The user device 100 may be a mobile device in some aspects and includes an application processor 105, base-band processor 110 (also referred to as a base-band sub-system), radio front end module (RFEM) 115, memory 120, connectivity sub-system 125, near field communication (NFC) controller 130, audio driver 135, camera driver 140, touch screen 145, display driver 150, sensors 155, removable memory 160, power management integrated circuit (PMIC) 165, and smart battery 170.

In some aspects, application processor 105 may include, for example, one or more central processing unit (CPU) cores and one or more of cache memory, low drop-out voltage regulators (LDOs), interrupt controllers, serial interfaces such as serial peripheral interface (SPI), inter-integrated circuit (I2C) or universal programmable serial interface sub-system, real time clock (RTC), timer-counters including interval and watchdog timers, general purpose IO, memory card controllers such as SD/MMC or similar, USB interfaces, mobile industry processor interface (MIPI) interfaces, and/or Joint Test Access Group (JTAG) test access ports.

In some aspects, base-band processor 110 may be implemented, for example, as a solder-down substrate including one or more integrated circuits, a single packaged integrated circuit soldered to a main circuit board, and/or a multi-chip module including two or more integrated circuits.

Applications of mmWave technology can include, for example, WiGig and future 5G, but the mmWave technology can be applicable to a variety of telecommunications systems. The mmWave technology can be especially attractive for short-range telecommunications systems. WiGig devices operate in the unlicensed 60 GHz band, whereas 5G mmWave is expected to operate initially in the licensed 28 GHz and 39 GHz bands. A block diagram of an example base-band processor 110 and RFEM 115 in a mmWave system is shown in FIG. 1A.

Figure 1A:
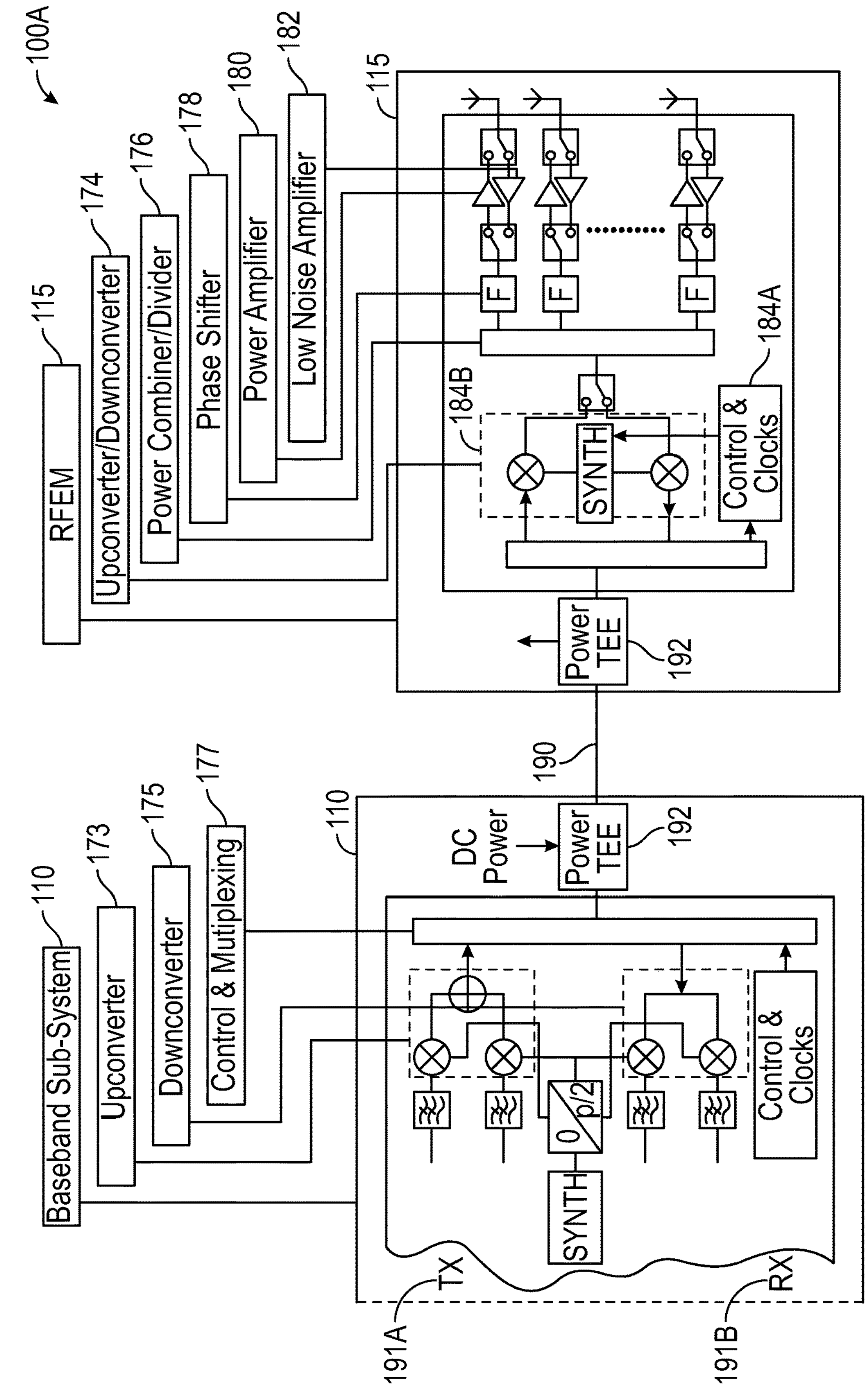
FIG. 1A illustrates a mmWave system, which can be used in connection with the device of FIG. 1 according to some aspects.

FIG. 1A illustrates a mmWave system 100A, which can be used in connection with the device 100 of FIG. 1 according to some aspects of the present disclosure. The system 100A includes two components: a base-band processor 110 and one or more radio front end modules (RFEMs) 115. The RFEM 115 can be connected to the base-band processor 110 by a single coaxial cable 190, which supplies a modulated intermediate frequency (IF) signal, DC power, clocking signals and control signals.

The base-band processor 110 is not shown in its entirety, but FIG. 1A rather shows an implementation of analog front end. This includes a transmitter (TX) section 191A with an upconverter 173 to intermediate frequency (IF) (around 10 GHz in current implementations), a receiver (RX) section 191B with downconversion 175 from IF to base-band, control and multiplexing circuitry 177 including a combiner to multiplex/demultiplex transmit and receive signals onto a single cable 190. In addition, power tee circuitry 192 (which includes discrete components) is included on the base-band circuit board to provide DC power for the RFEM 115. In some aspects, the combination of the TX section and RX section may be referred to as a transceiver, to which may be coupled one or more antennas or antenna arrays of the types described herein.

The RFEM 115 can be a small circuit board including a number of printed antennas and one or more RF devices containing multiple radio chains, including upconversion/downconversion 174 to millimeter wave frequencies, power combiner/divider 176, programmable phase shifting 178 and power amplifiers (PA) 180, low noise amplifiers (LNA) 182, as well as control and power management circuitry 184A and 184B. This arrangement can be different from Wi-Fi or cellular implementations, which generally have all RF and base-band functionality integrated into a single unit and only antennas connected remotely via coaxial cables.

This architectural difference can be driven by the very large power losses in coaxial cables at millimeter wave frequencies. These power losses can reduce the transmit power at the antenna and reduce receive sensitivity. In order to avoid this issue, in some aspects, PAs 180 and LNAs 182 may be moved to the RFEM 115 with integrated antennas. In addition, the RFEM 115 may include upconversion/downconversion 174 so that the IF signals over the coaxial cable 190 can be at a lower frequency. Additional system context for mmWave 5G apparatuses, techniques and features is discussed herein below.

Figure 2:
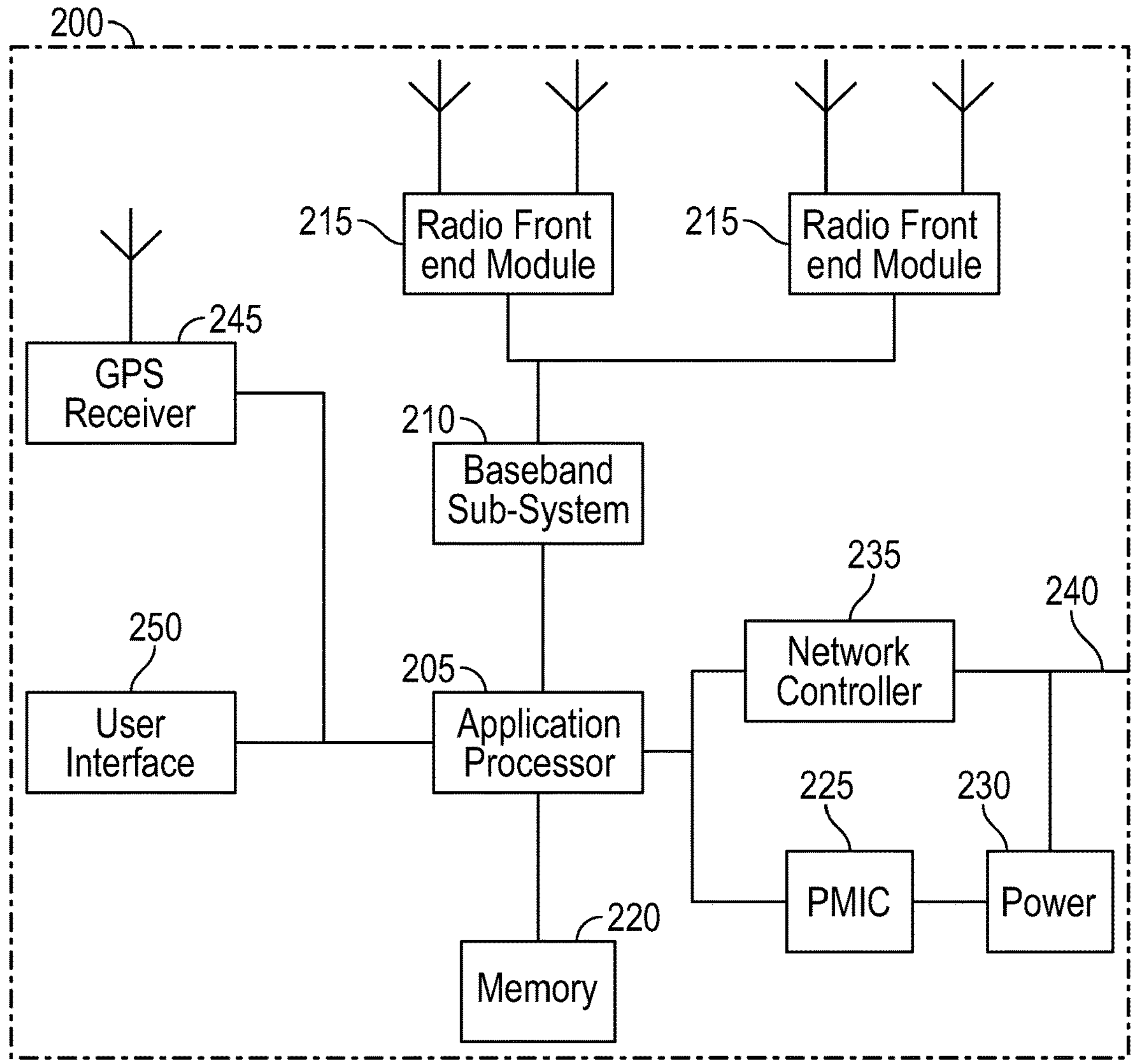
FIG. 2 illustrates an exemplary base station radio-head (RH) according to some aspects.

FIG. 2 illustrates an exemplary base station or infrastructure equipment radio head according to some aspects. The base station radio-head 200 may include one or more of application processor 205, base-band processors 210, one or more radio front end modules 215, memory 220, power management integrated circuitry (PMIC) 225, power tee circuitry 230, network controller 235, network interface connector 240, satellite navigation receiver (e.g., GPS receiver) 245, and user interface 250.

In some aspects, application processor 205 may include one or more CPU cores and one or more of cache memory, low drop-out voltage regulators (LDOs), interrupt controllers, serial interfaces such as SPI, I2C or universal programmable serial interface, real time clock (RTC), timer-counters including interval and watchdog timers, general purpose IO, memory card controllers such as SD/MMC or similar, USB interfaces, MIPI interfaces and Joint Test Access Group (JTAG) test access ports.

In some aspects, base-band processor 210 may be implemented, for example, as a solder-down substrate including one or more integrated circuits, a single packaged integrated circuit soldered to a main circuit board or a multi-chip sub-system including two or more integrated circuits.

In some aspects, memory 220 may include one or more of volatile memory including dynamic random access memory (DRAM) and/or synchronous DRAM (SDRAM), and non-volatile memory (NVM) including high-speed electrically erasable memory (commonly referred to as Flash memory), phase-change random access memory (PRAM), magnetoresistive random access memory (MRAM), and/or a three-dimensional crosspoint memory. Memory 220 may be implemented as one or more of solder down packaged integrated circuits, socketed memory modules and plug-in memory cards.

In some aspects, power management integrated circuitry 225 may include one or more of voltage regulators, surge protectors, power alarm detection circuitry and one or more backup power sources such as a battery or capacitor. Power alarm detection circuitry may detect one or more of brown out (under-voltage) and surge (over-voltage) conditions.

In some aspects, power tee circuitry 230 may provide for electrical power drawn from a network cable. Power tee circuitry 230 may provide both power supply and data connectivity to the base station radio-head 200 using a single cable.

In some aspects, network controller 235 may provide connectivity to a network using a standard network interface protocol such as Ethernet. Network connectivity may be provided using a physical connection which is one of electrical (commonly referred to as copper interconnect), optical or wireless.

In some aspects, satellite navigation receiver 245 may include circuitry to receive and decode signals transmitted by one or more navigation satellite constellations such as the global positioning system (GPS), Globalnaya Navigatsionnaya Sputnikovaya Sistema (GLONASS), Galileo and/or BeiDou. The receiver 245 may provide, to application processor 205, data which may include one or more of position data or time data. Time data may be used by application processor 205 to synchronize operations with other radio base stations or infrastructure equipment.

In some aspects, user interface 250 may include one or more of buttons. The buttons may include a reset button. User interface 250 may also include one or more indicators such as LEDs and a display screen. As briefly mentioned earlier herein, systems can include multiple RHs similar to that shown in FIG. 2, and further description of other components of a RH and a system incorporating a RH are described with reference to FIG. 10 below.

Figure 3A:
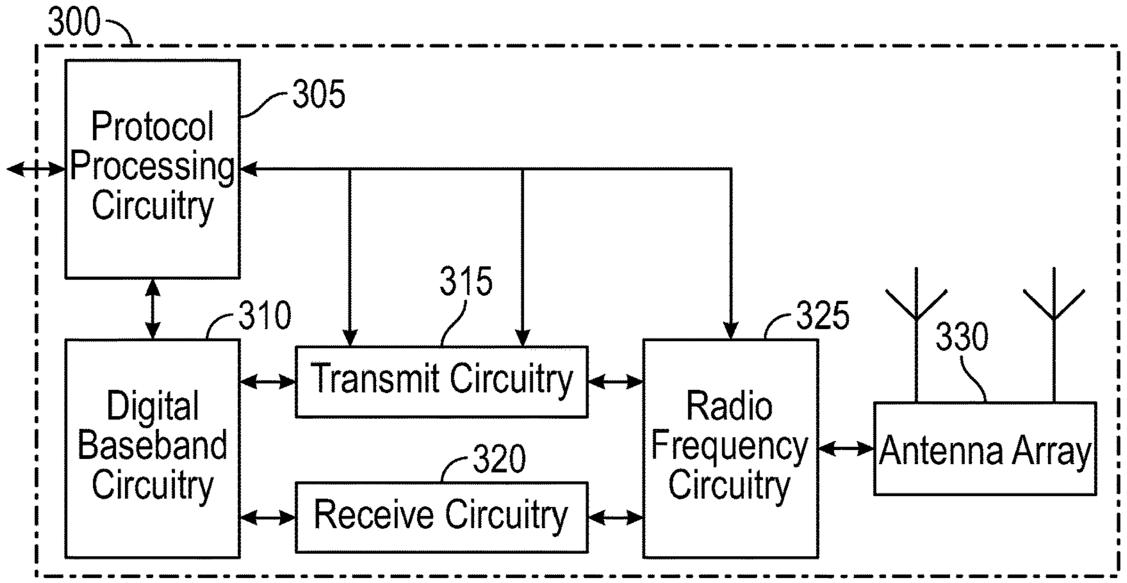
FIG. 3A illustrates exemplary wireless communication circuitry according to some aspects.
Figure 3B:
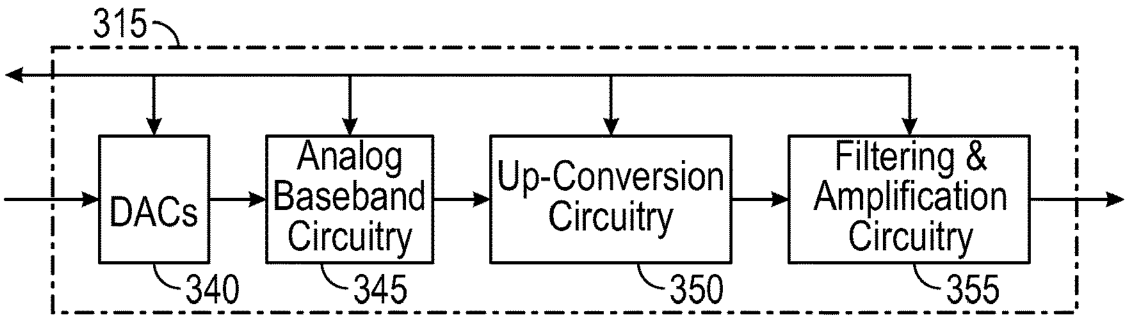
FIG. 3B illustrates aspects of exemplary transmit circuitry illustrated in FIG. 3A according to some aspects.
Figure 3C:
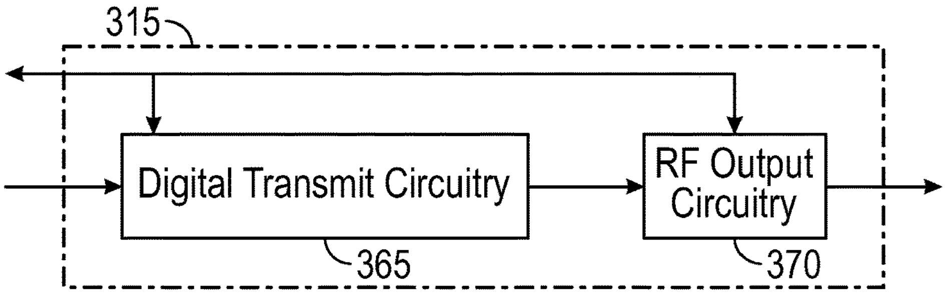
FIG. 3C illustrates aspects of exemplary transmit circuitry illustrated in FIG. 3A according to some aspects.
Figure 3D:
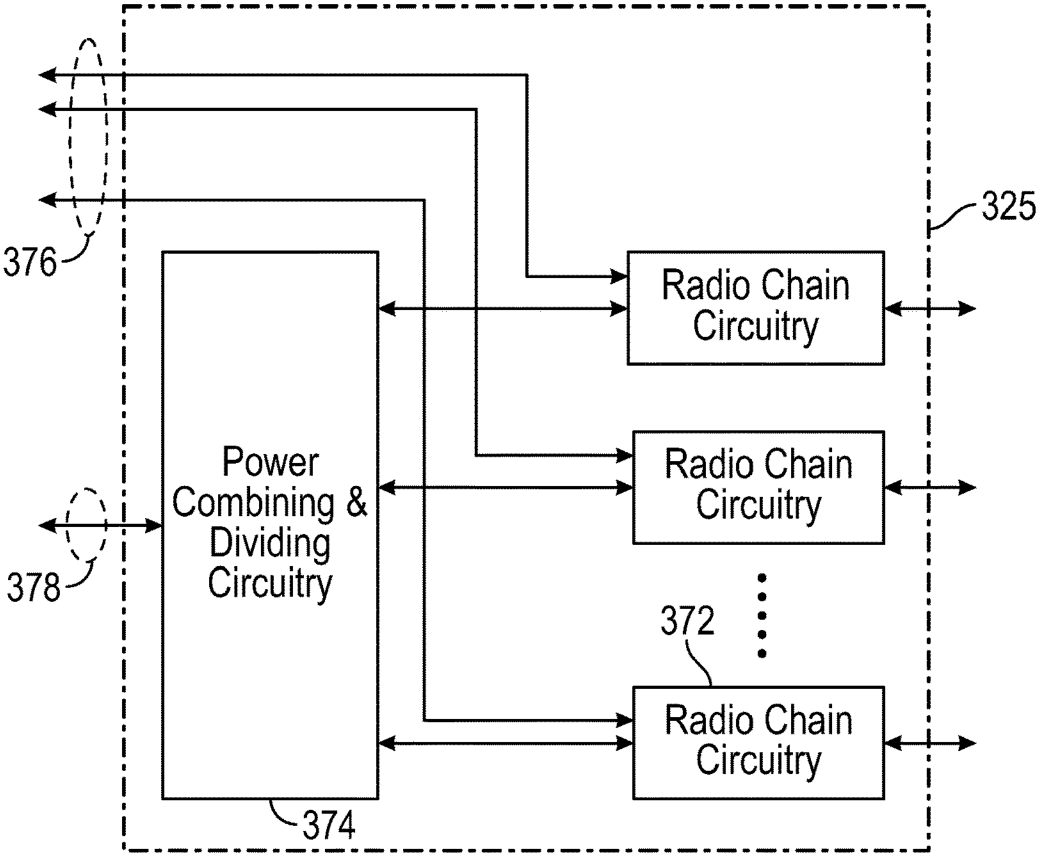
FIG. 3D illustrates aspects of exemplary radio frequency circuitry illustrated in FIG. 3A according to some aspects.
Figure 3E:
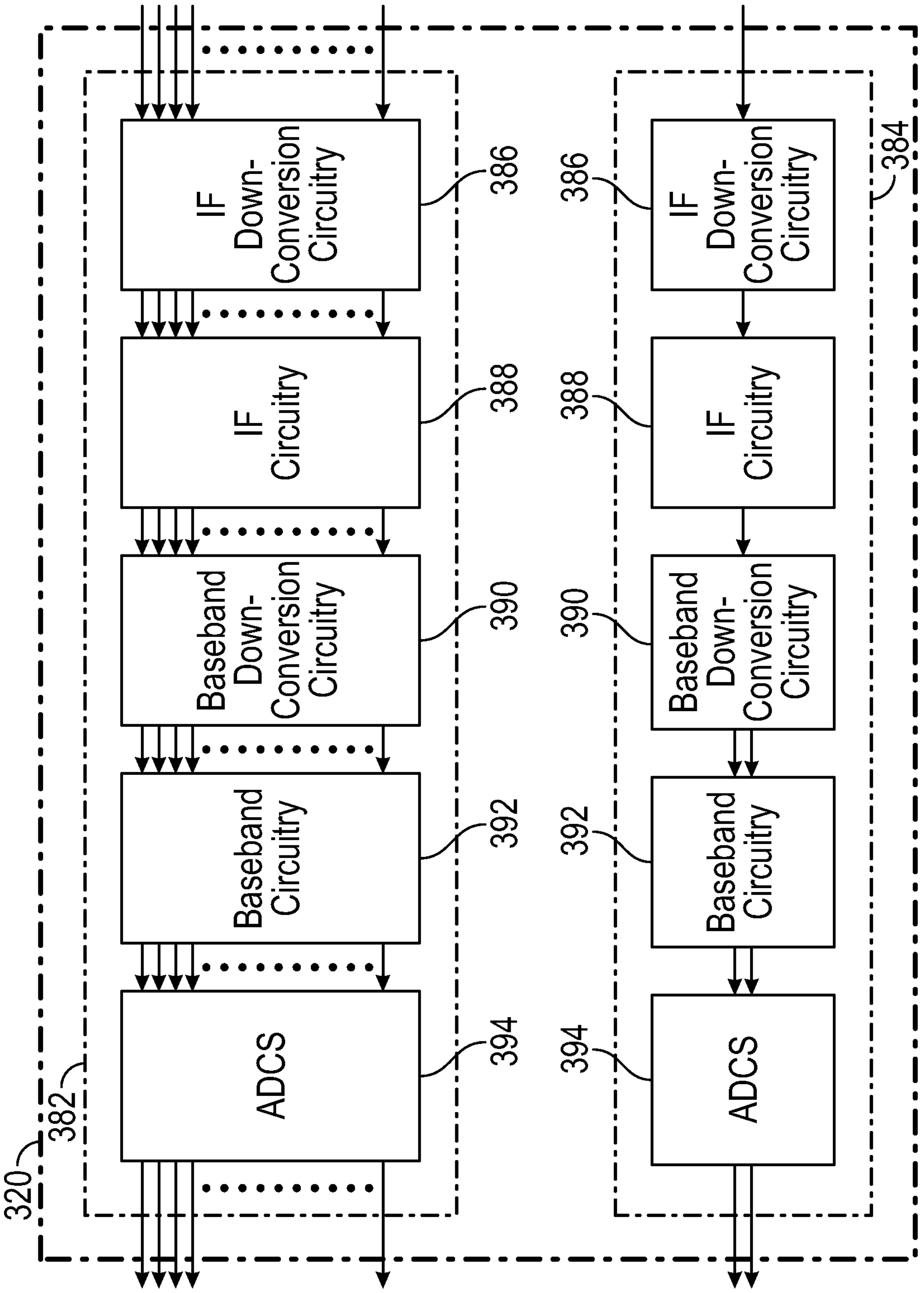
FIG. 3E illustrates aspects of exemplary receive circuitry in FIG. 3A according to some aspects.

FIG. 3A illustrates exemplary wireless communication circuitry according to some aspects; FIGS. 3B and 3C illustrate aspects of transmit circuitry shown in FIG. 3A according to some aspects; FIG. 3D illustrates aspects of radio frequency circuitry shown in FIG. 3A according to some aspects; FIG. 3E illustrates aspects of receive circuitry in FIG. 3A according to some aspects. Wireless communication circuitry 300 shown in FIG. 3A may be alternatively grouped according to functions. Components illustrated in FIG. 3A are provided here for illustrative purposes and may include other components not shown in FIG. 3A.

Wireless communication circuitry 300 may include protocol processing circuitry 305 (or processor) or other means for processing. Protocol processing circuitry 305 may implement one or more of medium access control (MAC), radio link control (RLC), packet data convergence protocol (PDCP), radio resource control (RRC) and non-access stratum (NAS) functions, among others. Protocol processing circuitry 305 may include one or more processing cores to execute instructions and one or more memory structures to store program and data information.

Wireless communication circuitry 300 may further include digital base-band circuitry 310. Digital base-band circuitry 310 may implement physical layer (PHY) functions including one or more of hybrid automatic repeat request (HARM) functions, scrambling and/or descrambling, coding and/or decoding, layer mapping and/or de-mapping, modulation symbol mapping, received symbol and/or bit metric determination, multi-antenna port pre-coding and/or decoding which may include one or more of space-time, space-frequency or spatial coding, reference signal generation and/or detection, preamble sequence generation and/or decoding, synchronization sequence generation and/or detection, control channel signal blind decoding, and other related functions.

Wireless communication circuitry 300 may further include transmit circuitry 315, receive circuitry 320 and/or antenna array circuitry 330. Wireless communication circuitry 300 may further include RF circuitry 325. In some aspects, RF circuitry 325 may include one or multiple parallel RF chains for transmission and/or reception. Each of the RF chains may be connected to one or more antennas of antenna array circuitry 330.

In some aspects, protocol processing circuitry 305 may include one or more instances of control circuitry. The control circuitry may provide control functions for one or more of digital base-band circuitry 310, transmit circuitry 315, receive circuitry 320, and/or RF circuitry 325.

FIGS. 3B and 3C illustrate aspects of transmit circuitry shown in FIG. 3A according to some aspects. Transmit circuitry 315 shown in FIG. 3B may include one or more of digital to analog converters (DACs) 340, analog base-band circuitry 345, up-conversion circuitry 350 and/or filtering and amplification circuitry 355. DACs 340 may convert digital signals into analog signals. Analog base-band circuitry 345 may perform multiple functions as indicated below. Up-conversion circuitry 350 may up-convert base-band signals from analog base-band circuitry 345 to RF frequencies (e.g., mmWave frequencies). Filtering and amplification circuitry 355 may filter and amplify analog signals. Control signals may be supplied between protocol processing circuitry 305 and one or more of DACs 340, analog base-band circuitry 345, up-conversion circuitry 350 and/or filtering and amplification circuitry 355.

Transmit circuitry 315 shown in FIG. 3C may include digital transmit circuitry 365 and RF circuitry 370. In some aspects, signals from filtering and amplification circuitry 355 may be provided to digital transmit circuitry 365. As above, control signals may be supplied between protocol processing circuitry 305 and one or more of digital transmit circuitry 365 and RF circuitry 370.

FIG. 3D illustrates aspects of radio frequency circuitry shown in FIG. 3A according to some aspects. Radio frequency circuitry 325 may include one or more instances of radio chain circuitry 372, which in some aspects may include one or more filters, power amplifiers, low noise amplifiers, programmable phase shifters and power supplies.

Radio frequency circuitry 325 may also in some aspects include power combining and dividing circuitry 374. In some aspects, power combining and dividing circuitry 374 may operate bidirectionally, such that the same physical circuitry may be configured to operate as a power divider when the device is transmitting, and as a power combiner when the device is receiving. In some aspects, power combining and dividing circuitry 374 may include one or more wholly or partially separate circuitries to perform power dividing when the device is transmitting and power combining when the device is receiving. In some aspects, power combining and dividing circuitry 374 may include passive circuitry including one or more two-way power divider/combiners arranged in a tree. In some aspects, power combining and dividing circuitry 374 may include active circuitry including amplifier circuits.

In some aspects, radio frequency circuitry 325 may connect to transmit circuitry 315 and receive circuitry 320 in FIG. 3A. Radio frequency circuitry 325 may connect to transmit circuitry 315 and receive circuitry 320 via one or more radio chain interfaces 376 and/or a combined radio chain interface 378. In some aspects, one or more radio chain interfaces 376 may provide one or more interfaces to one or more receive or transmit signals, each associated with a single antenna structure. In some aspects, the combined radio chain interface 378 may provide a single interface to one or more receive or transmit signals, each associated with a group of antenna structures.

FIG. 3E illustrates aspects of receive circuitry in FIG. 3A according to some aspects. Receive circuitry 320 may include one or more of parallel receive circuitry 382 and/or one or more of combined receive circuitry 384. In some aspects, the one or more parallel receive circuitry 382 and one or more combined receive circuitry 384 may include one or more Intermediate Frequency (IF) down-conversion circuitry 386, IF processing circuitry 388, base-band down-conversion circuitry 390, base-band processing circuitry 392 and analog-to-digital converter (ADC) circuitry 394. As used herein, the term "intermediate frequency" refers to a frequency to which a carrier frequency (or a frequency signal) is shifted as in intermediate step in transmission, reception, and/or signal processing. IF down-conversion circuitry 386 may convert received RF signals to IF. IF processing circuitry 388 may process the IF signals, e.g., via filtering and amplification. Base-band down-conversion circuitry 390 may convert the signals from IF processing circuitry 388 to base-band. Base-band processing circuitry 392 may process the base-band signals, e.g., via filtering and amplification. ADC circuitry 394 may convert the processed analog base-band signals to digital signals.

Figure 4:
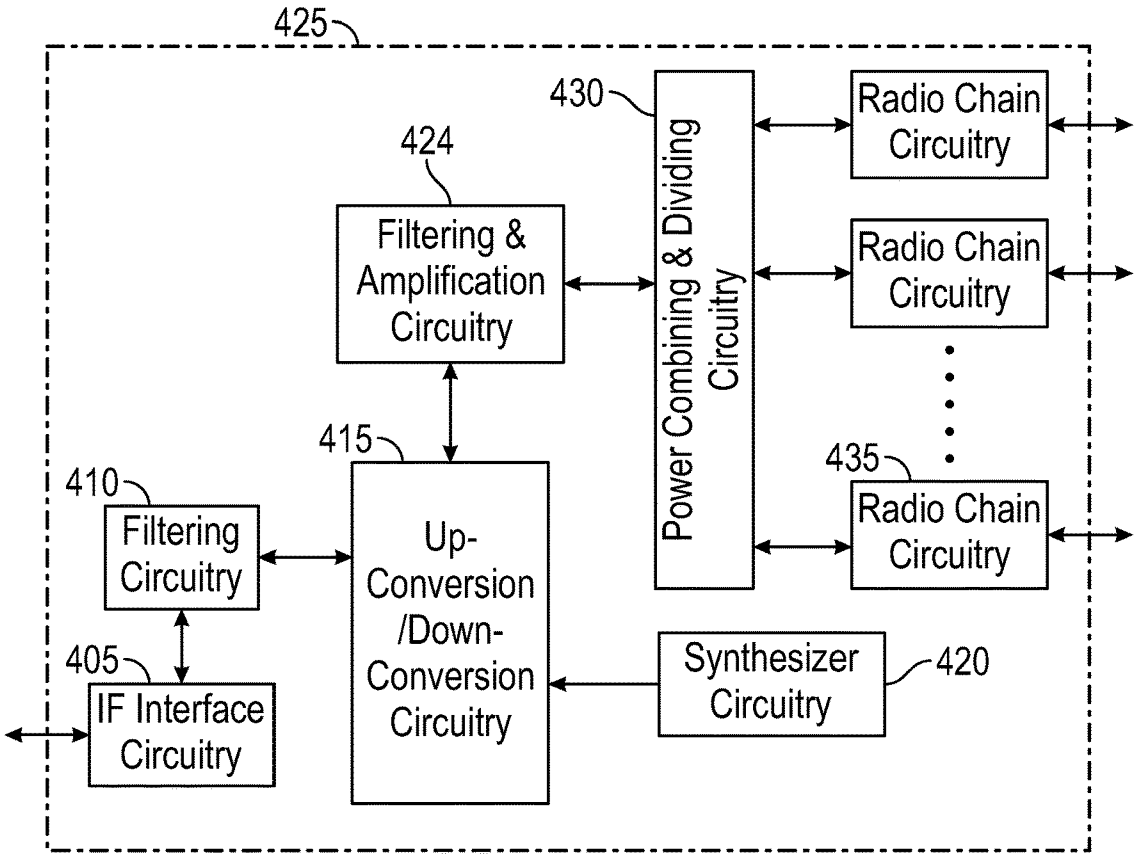
FIG. 4 illustrates exemplary useable RF circuitry in FIG. 3A according to some aspects.

FIG. 4 illustrates exemplary RF circuitry of FIG. 3A according to some aspects. In an aspect, RF circuitry 325 in FIG. 3A (depicted in FIG. 4 using reference number 425) may include one or more of the IF interface circuitry 405, filtering circuitry 410, up-conversion and down-conversion circuitry 415, synthesizer circuitry 420, filtering and amplification circuitry 424, power combining and dividing circuitry 430, and radio chain circuitry 435.

Figure 5A:
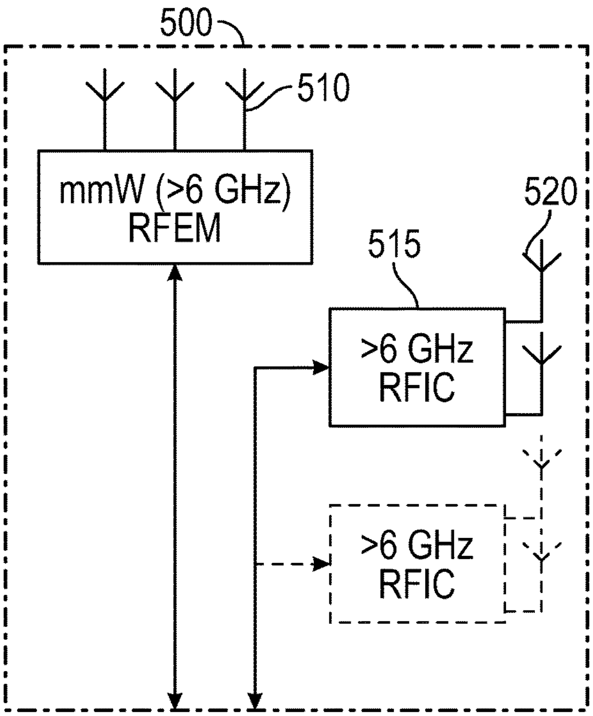
FIG. 5A illustrates an aspect of an exemplary radio front end module (RFEM) according to some aspects.
Figure 5B:
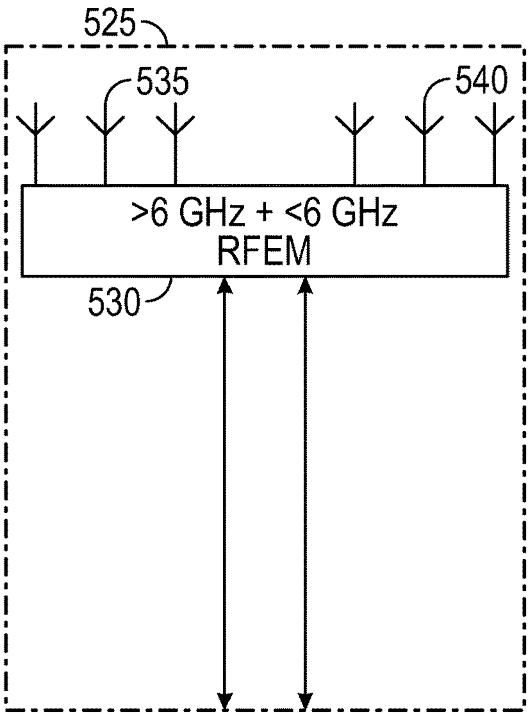
FIG. 5B illustrates an alternate aspect of an exemplary radio front end module, according to some aspects.

FIG. 5A and FIG. 5B illustrate aspects of a radio front-end module (RFEM) useable in the circuitry shown in FIG. 1 and FIG. 2, according to some aspects. FIG. 5A illustrates an aspect of a RFEM according to some aspects. RFEM 500 incorporates a millimeter wave RFEM and one or more above-six gigahertz radio frequency integrated circuits (RFIC) 515 and/or one or more sub-six gigahertz RFICs (not shown in FIG. 5A). In this aspect, the one or more sub-six gigahertz RFICs 515 and/or one or more sub-six gigahertz RFICs may be physically separated from millimeter wave RFEM. RFICs 515 may include connection to one or more antennas 520. RFEM may include multiple antennas 510.

FIG. 5B illustrates an alternate aspect of a radio front end module 525, according to some aspects. In this aspect both millimeter wave and sub-six gigahertz radio functions may be implemented in the same physical radio front end module (RFEM) 530. RFEM 530 may incorporate both millimeter wave antennas 535 and sub-six gigahertz antennas 540.

Figure 6:
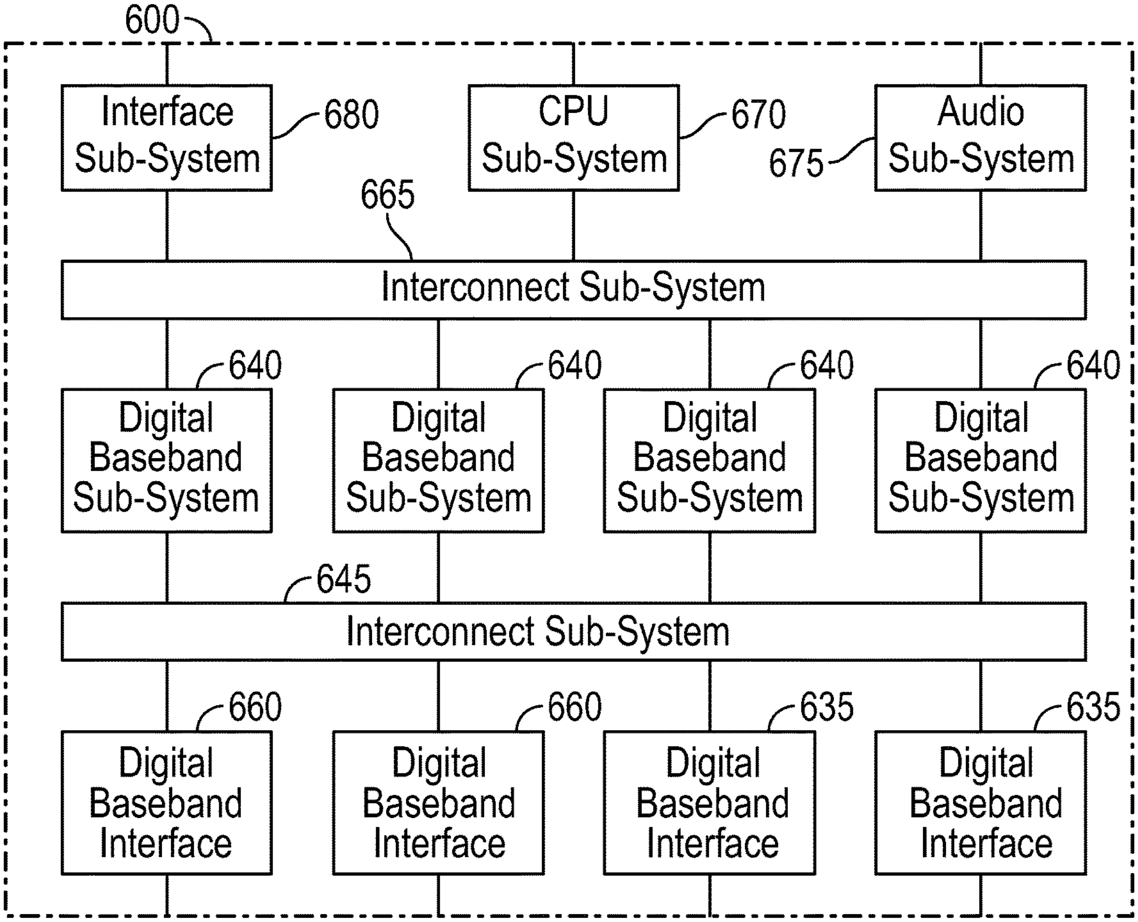
FIG. 6 illustrates an exemplary multi-protocol base-band processor useable in FIG. 1 or FIG. 2, according to some aspects.

FIG. 6 illustrates a multi-protocol base-band processor 600 useable in the system and circuitry shown in FIG. 1 or FIG. 2, according to some aspects. In an aspect, base-band processor may contain one or more digital base-band subsystems 640, also herein referred to collectively as digital base-band subsystems 640.

In an aspect, the one or more digital base-band subsystems 640 may be coupled via interconnect subsystem 665 to one or more of CPU subsystem 670, audio subsystem 675 and interface subsystem 680. In an aspect, the one or more digital base-band subsystems 640 may be coupled via interconnect subsystem 645 to one or more of each of digital base-band interface 660 and mixed-signal base-band subsystem 635.

In an aspect, interconnect subsystem 665 and 645 may each include one or more of each of buses point-to-point connections and network-on-chip (NOC) structures. In an aspect, audio subsystem 675 may include one or more of digital signal processing circuitry, buffer memory, program memory, speech processing accelerator circuitry, data converter circuitry such as analog-to-digital and digital-to-analog converter circuitry, and analog circuitry including one or more of amplifiers and filters.

Figure 7:
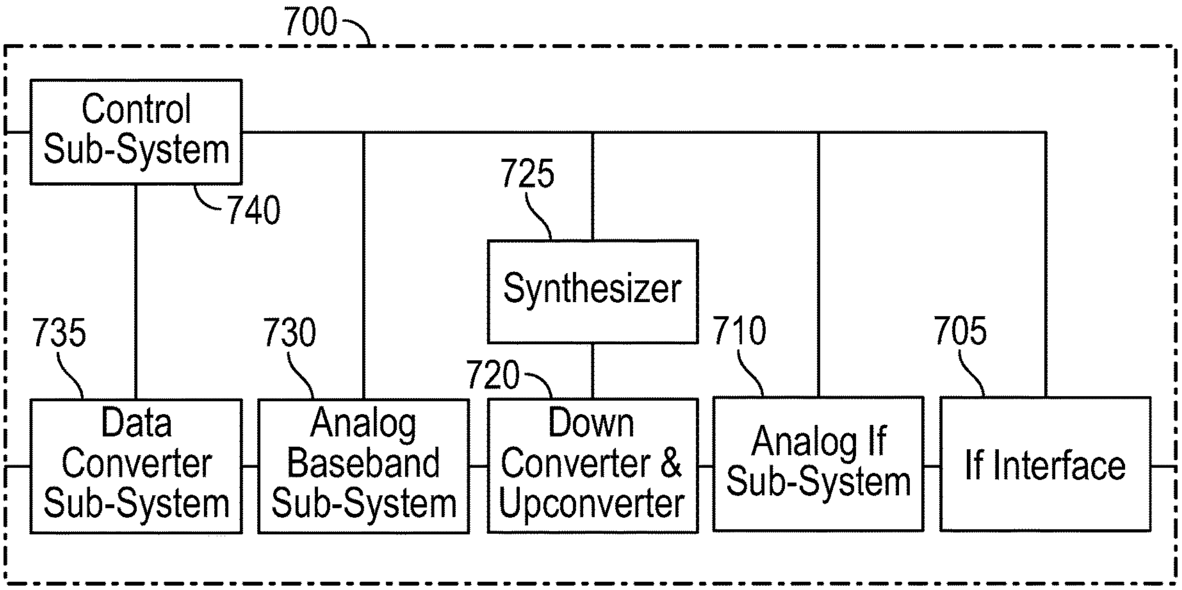
FIG. 7 illustrates an exemplary mixed signal base-band subsystem, according to some aspects.

FIG. 7 illustrates an exemplary of a mixed signal base-band subsystem 700, according to some aspects. In an aspect, mixed signal base-band subsystem 700 may include one or more of IF interface 705, analog IF subsystem 710, down-converter and up-converter subsystem 720, analog base-band subsystem 730, data converter subsystem 735, synthesizer 725 and control subsystem 740.

Figure 8A:
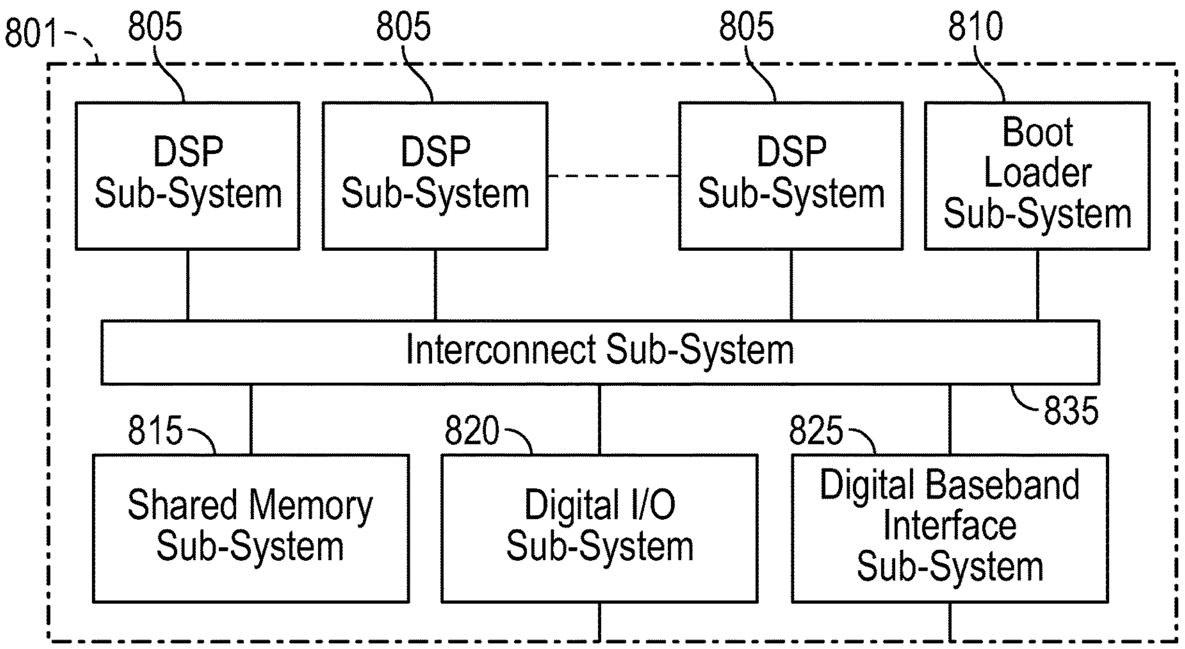
FIG. 8A illustrates an exemplary digital base-band subsystem, according to some aspects.
Figure 8B:
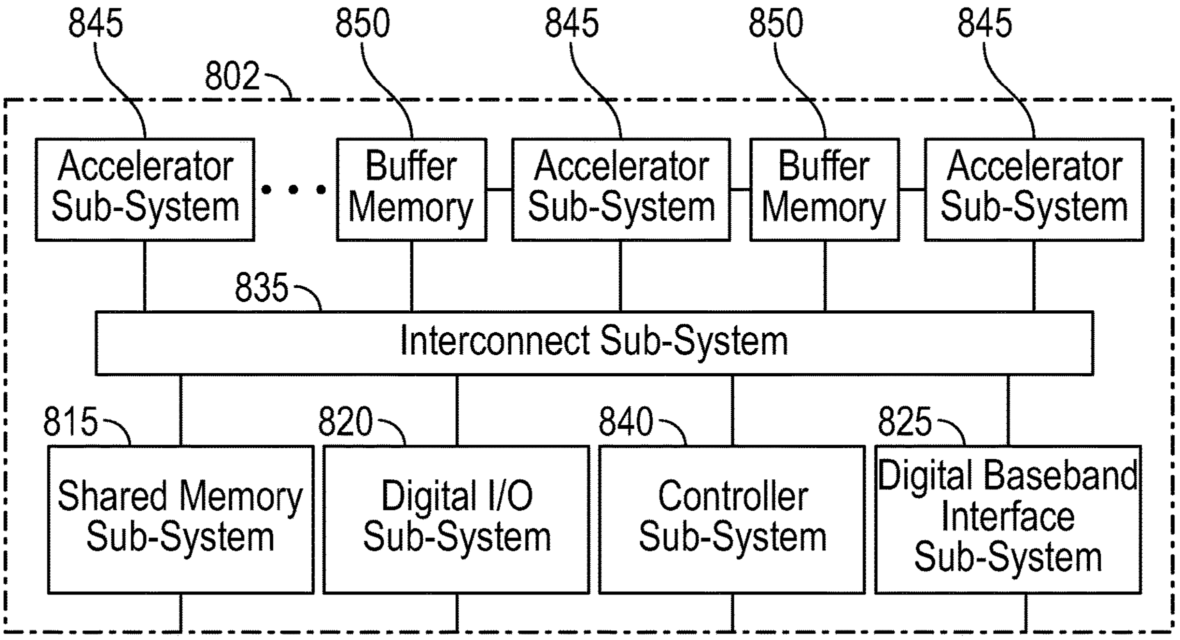
FIG. 8B illustrates an alternate aspect of an exemplary base-band processing subsystem, according to some aspects.

FIG. 8A illustrates a digital base-band processing subsystem 801, according to some aspects. FIG. 8B illustrates an alternate aspect of a digital base-band processing subsystem 802, according to some aspects.

In an aspect of FIG. 8A, the digital base-band processing subsystem 801 may include one or more of each of digital signal processor (DSP) subsystems 805, interconnect subsystem 835, boot loader subsystem 810, shared memory subsystem 815, digital I/O subsystem 820, and digital base-band interface subsystem 825.

In an aspect of FIG. 8B, digital base-band processing subsystem 802 may include one or more of each of accelerator subsystem 845, buffer memory 850, interconnect subsystem 835, shared memory subsystem 815, digital I/O subsystem 820, controller subsystem 840 and digital base-band interface subsystem 825.

In an aspect, boot loader subsystem 810 may include digital logic circuitry configured to perform configuration of the program memory and running state associated with each of the one or more DSP subsystems 805. Configuration of the program memory of each of the one or more DSP subsystems 805 may include loading executable program code from storage external to digital base-band processing subsystems 801 and 802. Configuration of the running state associated with each of the one or more DSP subsystems 805 may include one or more of the steps of: setting the state of at least one DSP core which may be incorporated into each of the one or more DSP subsystems 805 to a state in which it is not running, and setting the state of at least one DSP core which may be incorporated into each of the one or more DSP subsystems 805 into a state in which it begins executing program code starting from a predefined memory location.

In an aspect, shared memory subsystem 815 may include one or more of read-only memory (ROM), static random access memory (SRAM), embedded dynamic random access memory (eDRAM) and/or non-volatile random access memory (NVRAM).

In an aspect, digital I/O subsystem 820 may include one or more of serial interfaces such as Inter-Integrated Circuit (I2C), Serial Peripheral Interface (SPI) or other 1, 2 or 3-wire serial interfaces, parallel interfaces such as general-purpose input-output (GPIO), register access interfaces and direct memory access (DMA). In an aspect, a register access interface implemented in digital I/O subsystem 820 may permit a microprocessor core external to digital base-band processing subsystem 801 to read and/or write one or more of control and data registers and memory. In an aspect, DMA logic circuitry implemented in digital I/O subsystem 820 may permit transfer of contiguous blocks of data between memory locations including memory locations internal and external to digital base-band processing subsystem 801.

In an aspect, digital base-band interface subsystem 825 may provide for the transfer of digital base-band samples between base-band processing subsystem and mixed signal base-band or radio-frequency circuitry external to digital base-band processing subsystem 801. In an aspect, digital base-band samples transferred by digital base-band interface subsystem 825 may include in-phase and quadrature (I/Q) samples.

In an aspect, controller subsystem 840 may include one or more of each of control and status registers and control state machines. In an aspect, control and status registers may be accessed via a register interface and may provide for one or more of: starting and stopping operation of control state machines, resetting control state machines to a default state, configuring optional processing features, and/or configuring the generation of interrupts and reporting the status of operations. In an aspect, each of the one or more control state machines may control the sequence of operation of each of the one or more accelerator subsystems 845. There may be examples of implementations of both FIG. 8A and FIG. 8B in the same base-band subsystem.

Figure 9:
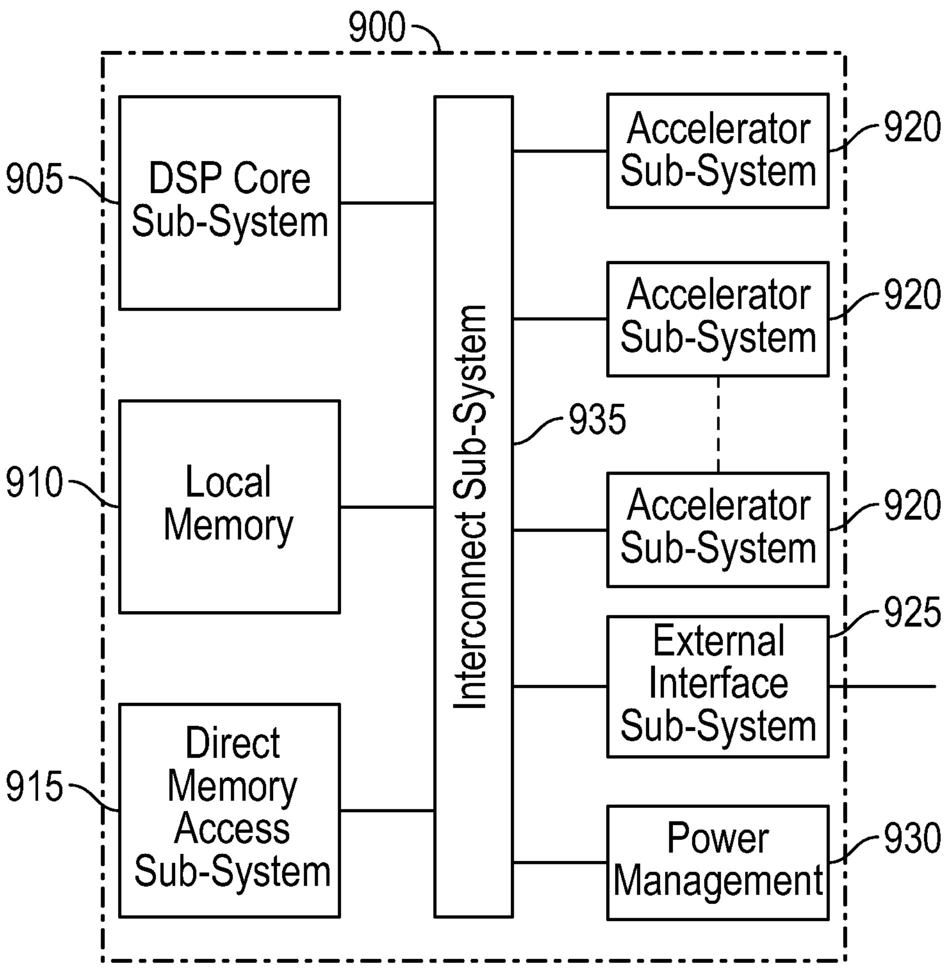
FIG. 9 illustrates an exemplary digital signal processor subsystem, according to some aspects.

FIG. 9 illustrates a digital signal processor (DSP) subsystem 900 according to some aspects. In an aspect, DSP subsystem 900 may include one or more of each of DSP core subsystem 905, local memory 910, direct memory access (DMA) subsystem 915, accelerator subsystem 920, external interface subsystem 925, power management circuitry 930 and interconnect subsystem 935.

In an aspect, the local memory 910 may include one or more of each of read-only memory, static random access memory or embedded dynamic random access memory.

In an aspect, the DMA subsystem 915 may provide registers and control state machine circuitry adapted to transfer blocks of data between memory locations including memory locations internal and external to DSP subsystem 900.

In an aspect, external interface subsystem 925 may provide for access by a microprocessor system external to DSP subsystem 900 to one or more of memory, control registers and status registers which may be implemented in DSP subsystem 900. In an aspect, external interface subsystem 925 may provide for transfer of data between local memory 910 and storage external to DSP subsystem 900 under the control of one or more of the DMA subsystem 915 and the DSP core subsystem 905.

Distributed Dithered Clock

As described earlier herein, clock transfer from a primary RH to another (e.g., "secondary") RH can be accompanied by a decline in SNR, reduced bandwidth or other problems. Systems, methods and apparatuses according to some aspects can provide dithering of a synchronizing clock signal using a Finite State Machine (FSM) in the primary RH unit. To prevent distortion in frequency estimation, the secondary RHs shall be provided, or have the ability to access, information regarding the dithering sequence used in generating the dithered clock signal. In one aspect, this information is provided through use of an identical FSM in the secondary RH units. In some aspects, the identical FSM is provided to primary and secondary RHs by implementation of a wake-up process, described later herein, wherein the FSM corresponding to the primary RH triggers FSMs corresponding the secondary RHs. Theoretically, there is no limit to the number of secondary RHs that can learn dithering information from the primary RH. Systems, apparatuses and methods in accordance with aspects can provide virtually unbounded clock spreading capability, without compromising on the clock quality.

Figure 10:
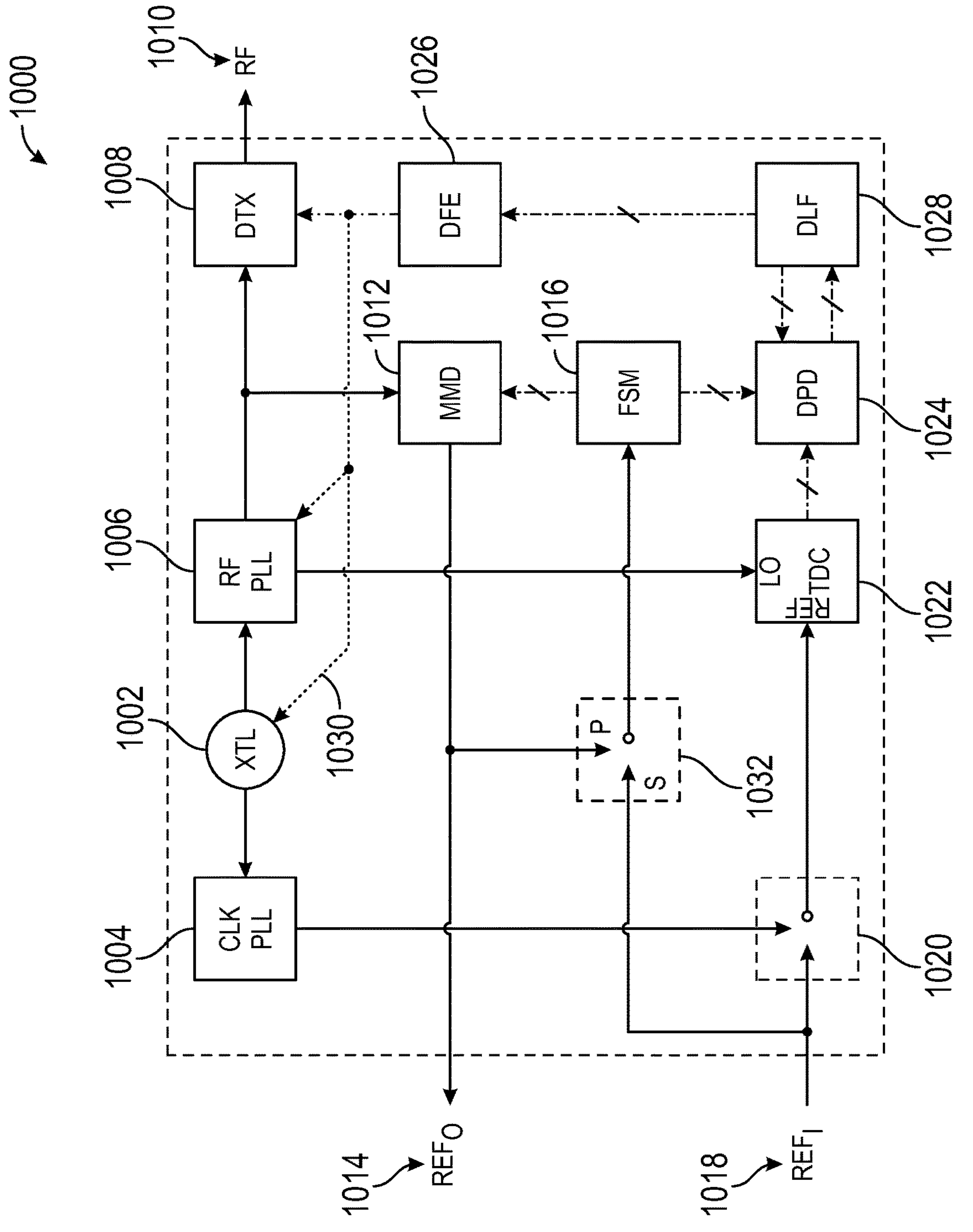
FIG. 10 illustrates an RH transmitter according to some aspects.

FIG. 10 illustrates an RH transmitter 1000 according to some aspects. As briefly mentioned earlier herein, systems can include multiple RHs, and a partial description of one such RH is shown in FIG. 10. Same or similar components can be included in both a primary RH and any secondary RHs.

The RH transmitter 1000 can include a reference clock 1002, which can comprise, for example, a quartz crystal. The reference clock 1002 can drive two synthesizers, one used for digital circuitry clocking (CLK PLL 1004) and the other for carrier frequency generation (RF PLL 1006). The Digital Transmitter RF chain (DTx) 1008 can modulate the carrier for generating the RF output signal 1010. The DTx chain 1008 can include same or similar components as described earlier herein with respect to FIGS. 3A-3D. The output of the RF PLL 1006 can also serve as the reference clock in the secondary RHs that are to transmit coherently with the primary RH. The high frequency output of the RF PLL 1006 can be used to drive a Multiple-Modulus-Divider 1012, which produces a divided down version of the carrier signal $REF_O$ 1014. This signal is also used as clocking signal to the Finite State Machine (FSM) 1016 governing the multi-modulus divider (MMD) 1012.

To allow off-line calibrations, the internal CLK PLL 1004 can be used in place of the $REF_I$ input signal 1018 (tuned to about the same frequency as the frequency expected by the secondary RH. A clock switch 1020 can be included to the Time-to-Digital converter (TDC) 1022 and corresponding phase processing circuitry (Digital Phase Detector—DPD) 1024 to serve for calibration purposes.

Once the calibrations have been performed, the secondary units will be switched into armed mode, waiting for a clock edge on the $REF_I$ input signal 1018. This clock will trigger the FSM 1016 of the secondary RH/s to perform a starting routine in virtual sync to the FSM 1016 of the primary RH. The same sequence as used for MMD modulation in the primary unit will be reported to the DPD 1024 circuitry of the secondary RH for compensation purposes.

The RH transmitter 1000 can include a Digital Front End (DFE) 1026. The DFE 1026 can include similar components as described earlier herein with respect to FIG. 1, FIG. 1A, FIG. 2, FIG. 5A and FIG. 5B. The RH transmitter 1000 can also include a digital low pass filter (DLF) 1028 to, for example, filter outputs of the DPD 1024. RH transmitter 1000 can further include other components of RF circuitry similar to those shown above with respect to FIG. 4.

As described earlier herein, clock transfer occurs between two or more RHs in a system. Frequency information of clock outputs can be filtered, and filtered frequency information can be applied as a correction to any of the frequency control mechanisms at 1030 to obtain output phase synchronization. The DFE 1026 can perform data manipulation depending on the point of the injection (control over the reference clock 1002 frequency, the RF PLL 1006 output frequency or the RF phase directly by means of the DTx chain 1008). This completes the synchronization aspect. Block 1032 allows the controller FSM to run off either a local version of the divided down (by MMD) clock or a non-local (e.g., remote or foreign) version. The former case can be considered a primary RH mode of operation whereas the latter can be considered a secondary RH mode of operation.

Assuming a constant frequency different between RH1 and RH2 crystals, of Δf=20 ppm, the output of the TDC in RH2 will be a slowly evolving phase ramp whose slope will be exactly $$\Delta f \cdot \frac{f_{LO}}{f_{REF}}.$$

Due to system noises and the quantization noise of the TDC, it will be necessary to low-pass filter the derivative of its output to arrive at this average slope. These signals are exemplified at FIGS. 11A and 11B.

Figure 11A:
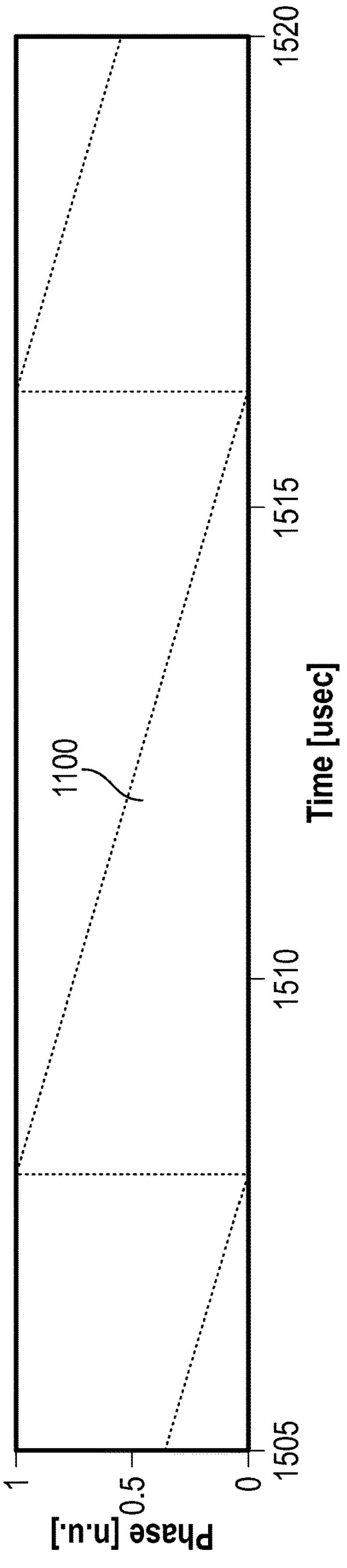
FIG. 11A illustrates a phase ramp at a TDC output of an RH according to some aspects.
Figure 11B:
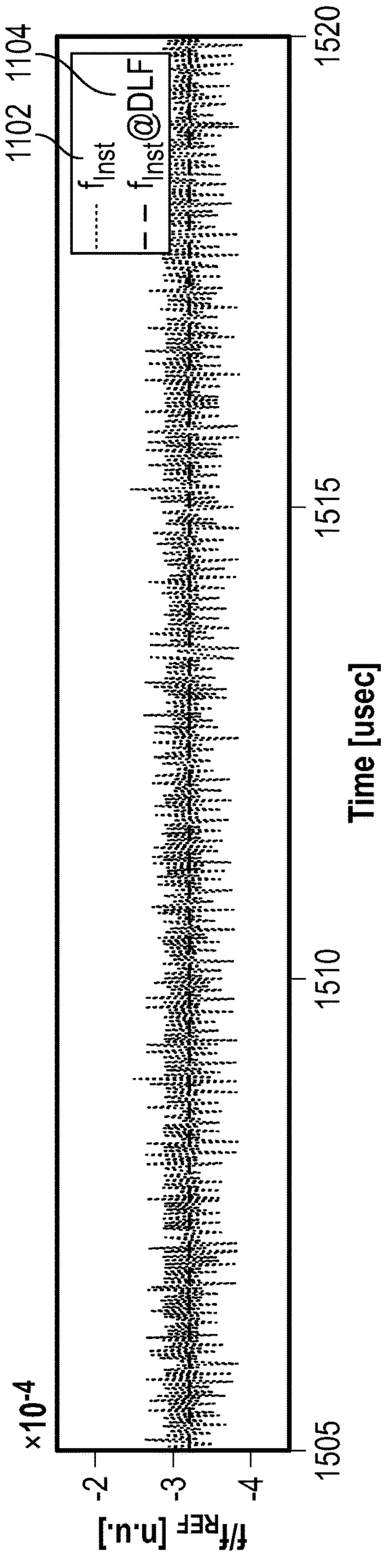
FIG. 11B illustrates instantaneous frequency before and after digital low pass filtering according to some aspects.

FIG. 11A illustrates a phase ramp 1100 at a TDC 1022 output of an RH transmitter 1000 according to some aspects. FIG. 11B illustrates instantaneous frequency before (see signal 1102) and after (signal 1104) digital low pass filtering according to some aspects.

Figure 12A:
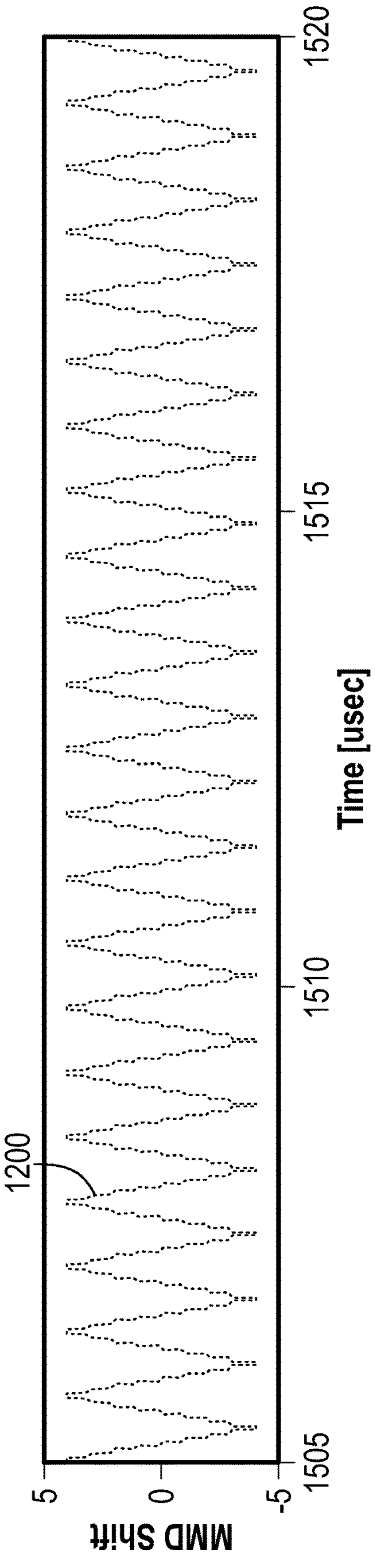
FIG. 12A illustrates a multi-modulus divider (MMD) modulation waveform according to some aspects.
Figure 12B:
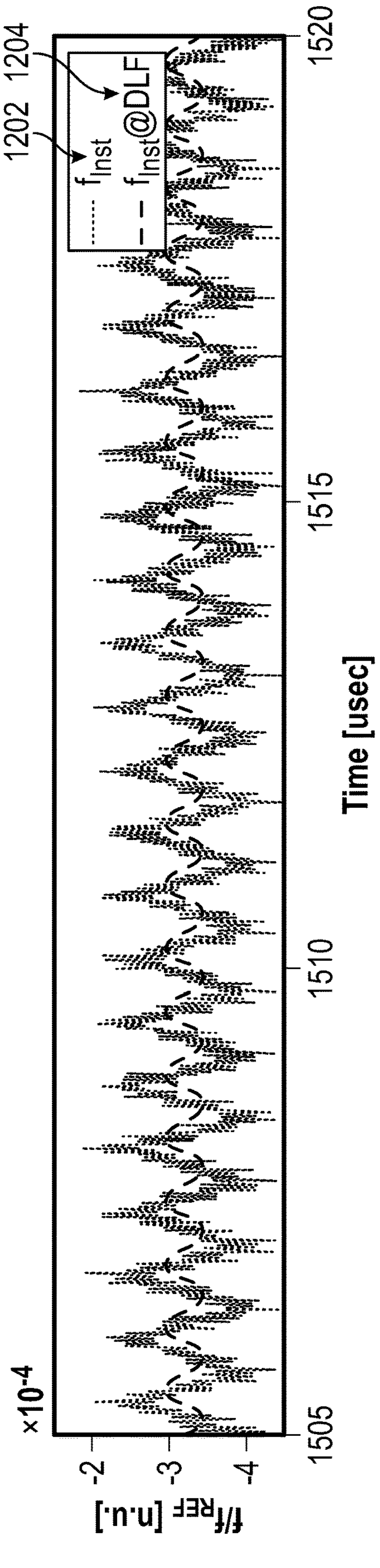
FIG. 12B illustrates instantaneous frequency pre- and post-filtering of the MMD modulation waveform according to some aspects.

Referring again to FIG. 1, before passing from a primary RH to a secondary RH, the reference clock 1002 is divided. FIG. 12A and FIG. 12B illustrate a result of this division.

FIG. 12A illustrates an MMD modulation waveform 1200 according to some aspects. FIG. 12B illustrates instantaneous frequency pre- and post-filtering (waveform 1202 and waveform 1204, respectively) of the MMD modulation waveform according to some aspects. In the example of FIG. 12A and FIG. 12B, the nominal division ratio is 16. When applying modulation, the division ratio changes from sample to sample. For example, the division ration can count down from 16 to a predetermined number (e.g., 12) then count back up to 16, then count up to another predetermined number (e.g., 20). Any such pattern can be used, and patterns can change periodically. FIG. 12A depicts the REF clock signal to which MMD modulation (=dN) has been applied, using a nominal division ratio.

FIG. 12B illustrates the information of FIG. 12A imprinted on the instantaneous frequency derived from the TDC samples, in waveform 1202. However, because the bulk of this information lies (spectrally) beyond the DLF cut-off, the information is mostly filtered (averaged) out as can be seen by comparing waveform 1204 and waveform 1202. Loss of the (filtered-out) information has deleterious consequences for communication because the information complements the non-equally-spread sampling instances of the phase measurement system in secondary RHs (comprising TDC 1022, DPD 1024 and DLF 1028) and the loss or corruption of the information results in missing synchronization information ultimately leading to appearance of periodic phase errors in the RF output signal 1010 (FIG. 10).

Figure 13:
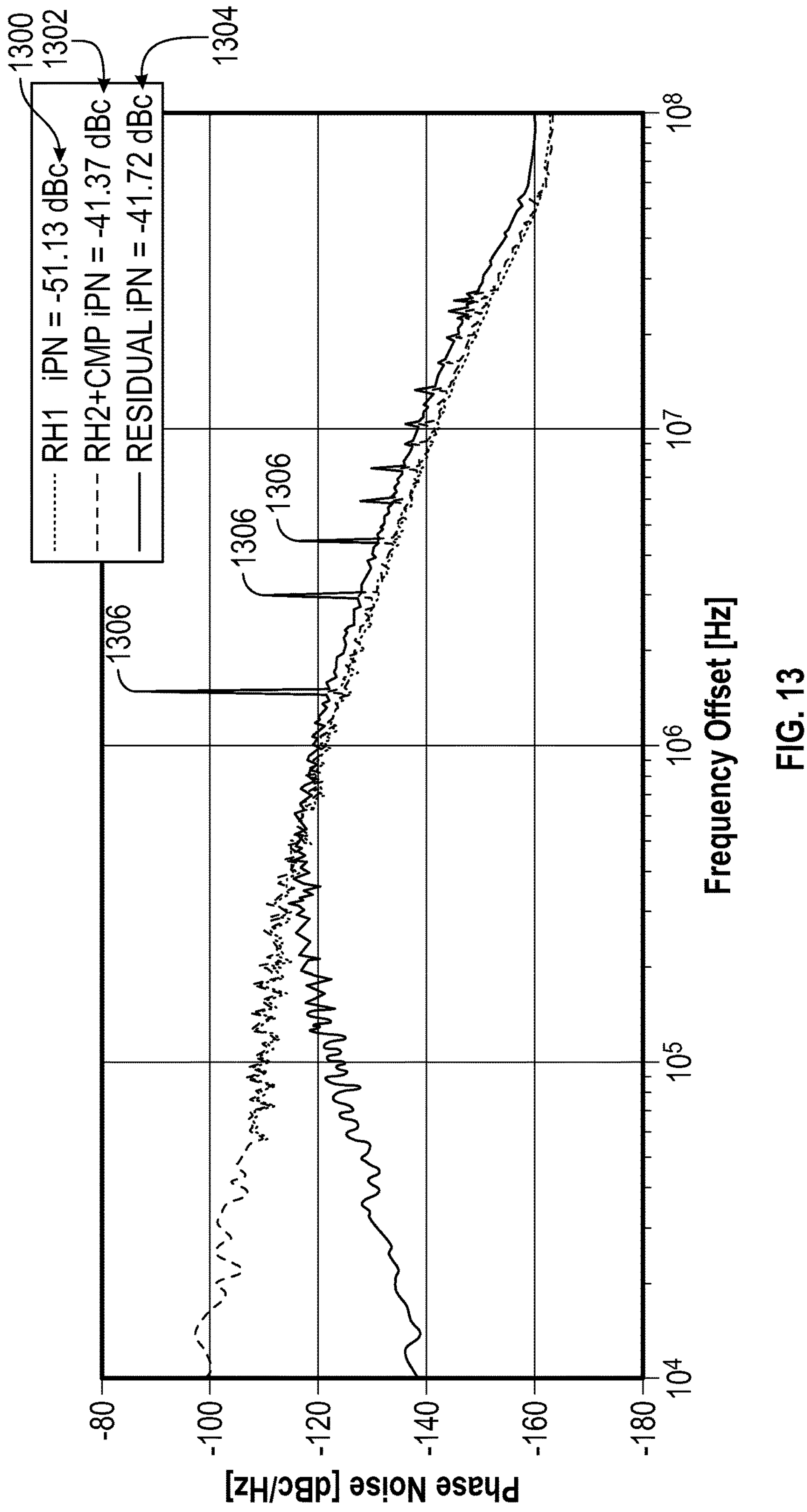
FIG. 13 illustrates phase noise versus frequency offset from the carrier with no compensation applied.

FIG. 13 illustrates phase noise versus frequency offset from the carrier with no compensation applied. The RF output signal 1010 of a primary RH is shown at signal 1300. The output of a secondary RH is shown at signal 1302 and the difference between signal 1300 and signal 1302 is given by signal 1304. Signal 1304 is plagued by numerous narrowband spurious signals 1306 as a manifestation of the period nature of the incurred phase error.

Referring back to FIG. 12A and FIG. 12B, the applied modulation alters the frequency or the distance between two consecutive edges of the MMD modulation waveform 1200. If the modulation is slow enough, the secondary RH or other RHs to which the clock signal is transferred can learn the modulation and consequently decode the clock signal. However, the rate of modulating is directly proportionate to the amount of smearing of the transmitted clock spectrum a narrower bandwidth is occupied when modulation is slow, and the spectral density of the received signal is higher. The end result can be a lower allowable SNR and the ensuing possibilities of either the system failing to meet EMI regulations or performance failure due to increased noise.

For at least these reasons, systems, methods and apparatuses according to some aspects provide a faster modulation, or dithering. A secondary (or multiple secondary) system can have previous knowledge of the dithering and related parameters, as described below. Systems, methods and apparatuses according to aspects can reduce or eliminate the loss of synchronization information (and accompanying corruption or other issues) that can occur with dithering.

In aspects, the synchronization information is conserved by generating an estimate, Compensation, according to Equation (1):

$$\text{Compensation}=\Delta f \cdot dN \tag{1}$$

where Δf is the instantaneous output of the DLF 1028 (after compensating for the modulation) and dN is the modulation shift provided by the synchronized FSM 1016 of the one or more secondary RHs. For example, dN can include information regarding how the MMD divisors change, and the pattern at which they change. In aspects, therefore, the synchronization information is conserved by removing the synchronization information prior to DLF filtering and re-instating it in the final RF output signal 1010.

Figure 14A:
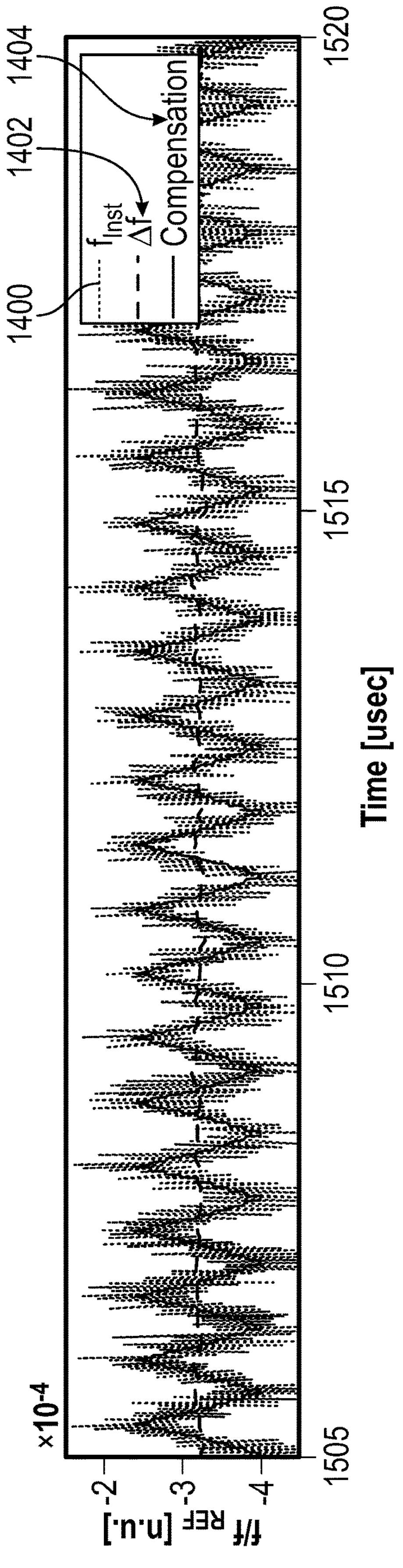
FIG. 14A illustrates instantaneous frequency, filtering output and compensation according to some aspects.

FIG. 14A illustrates instantaneous frequency 1400, filtering output 1402 and compensation 1404 according to some aspects. As seen in FIG. 14A, the computed compensation 1404 (calculated according to Equation (1) above) correlates well with the input instantaneous frequency 1400 resulting in relatively stable Δf estimate 1402. A relatively stable Δf estimate 1402 indicates that compensation has been accomplished accurately or correctly.

Figure 14B:
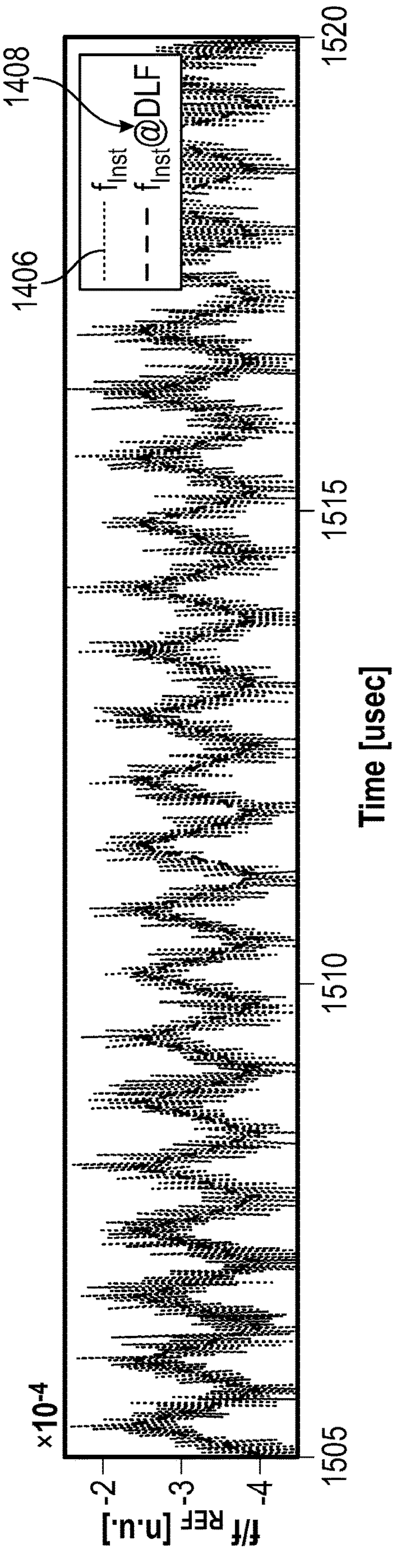
FIG. 14B illustrates instantaneous frequency pre- and post-filtering according to some aspects.

FIG. 14B illustrates instantaneous frequency pre- and post-filtering according to some aspects. Curve 1406 illustrates instantaneous frequency pre-filter according to DLF 1028, and curve 1408 illustrates instantaneous frequency post-filtering according to DLF 1028. As can be seen in FIG. 14B, and as compared to FIG. 12B, application of the compensation results in preservation of the information at the filtered-out instantaneous frequency (waveform 1408) compared to waveform 1204 (FIG. 12B). This ultimately removes the periodic error from the output signal as shown at FIG. 15.

Figure 15:
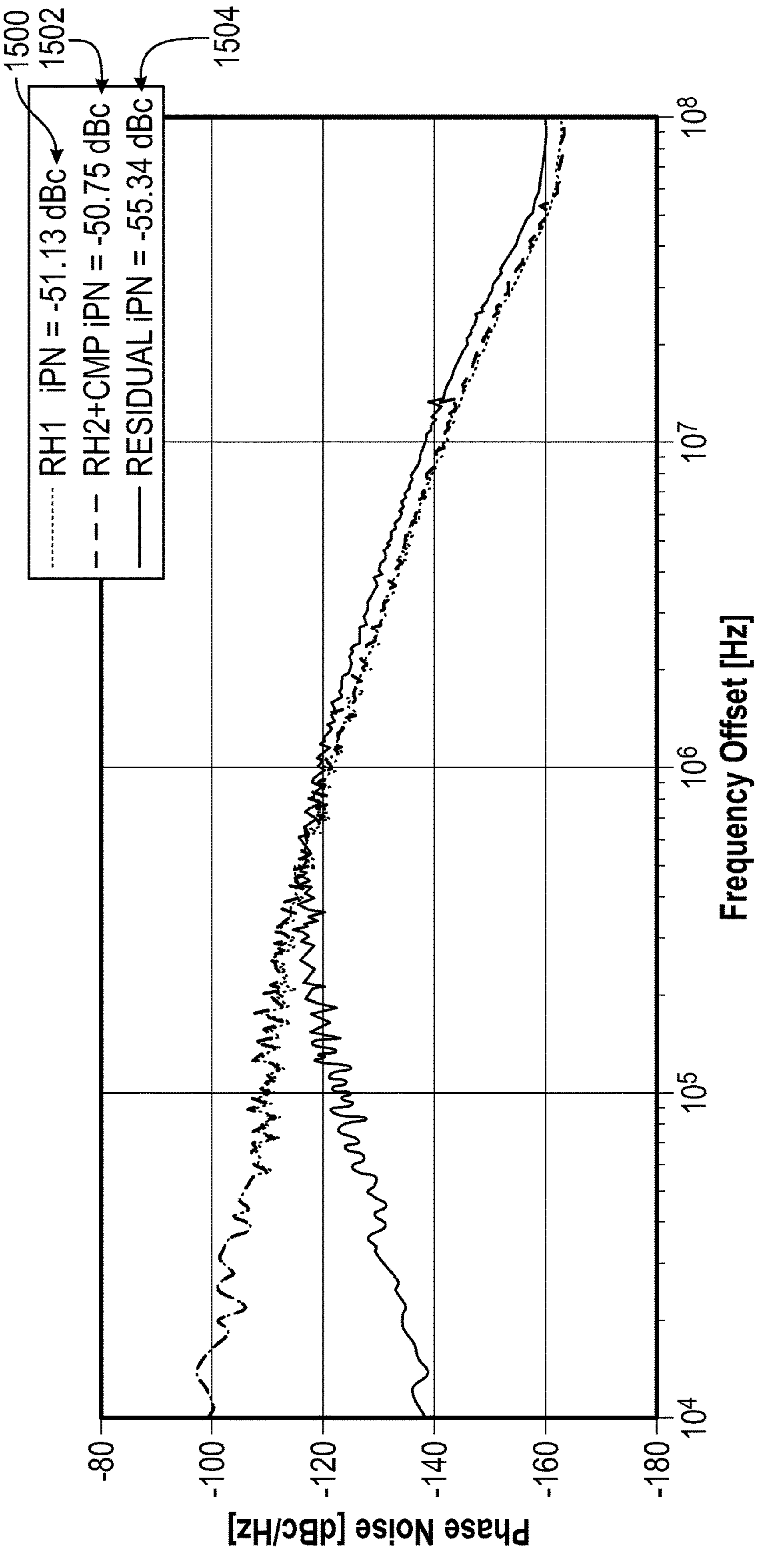
FIG. 15 illustrates phase noise versus frequency offset from the carrier with compensation applied according to some aspects.

FIG. 15 illustrates phase noise versus frequency offset from the carrier with compensation applied according to some aspects. The RF output signal 1010 of a primary RH is shown at signal 1500. The output of a secondary RH is shown at signal 1502. Signal 1504 is the difference between signal 1500 and signal 1502. As can be seen by comparing signal 1504 and signal 1304, periodic phase errors (e.g., "spurs") are reduced or eliminated. Furthermore, the RF output signal 1010 of the primary RH and secondary RH nearly coincides (as seen by the overlap of signal 1500 and signal 1502), showing that compensation is correct or nearly correct. FIG. 15 illustrates that even very fast dithering can be implemented and outputs of two or more RHs of a single device can track almost completely when compensation is accurate.

To provide the above compensation and dithering, a secondary RH (or multiple secondary RHs) shall have information regarding the parameters for dithering within the primary RH. This information can be provided by an FSM 1016. For example, a secondary RH can use information regarding at which point in a signal cycle the dithering has started, the divisors used by the MMD, the manner and rate at which the divisors change, and any other parameters. For example, the information can describe the nominal divisor (e.g., 16 from the above example), the maximum divisor changes in both upward and downward directions (e.g., 4 in the above example), the rate at which the divisor will be changing (every number of counts, 16 in the example above) and any other information. This information can be provided by programming of the FSM 1016.

Figure 16:
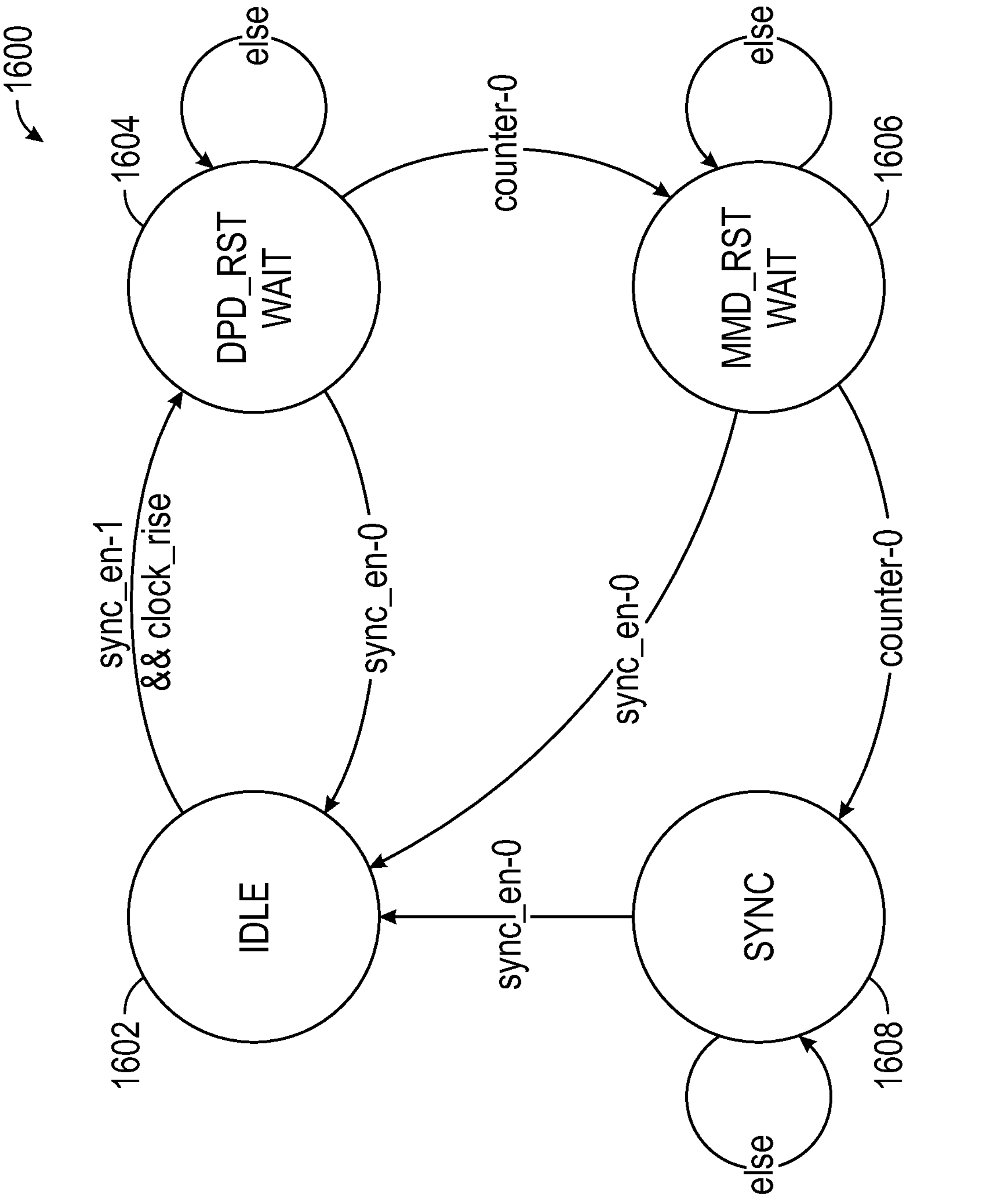
FIG. 16 illustrates a state transition diagram such as may be provided by or programmed into a finite state machine (FSM) according to some aspects.
Figure 17:
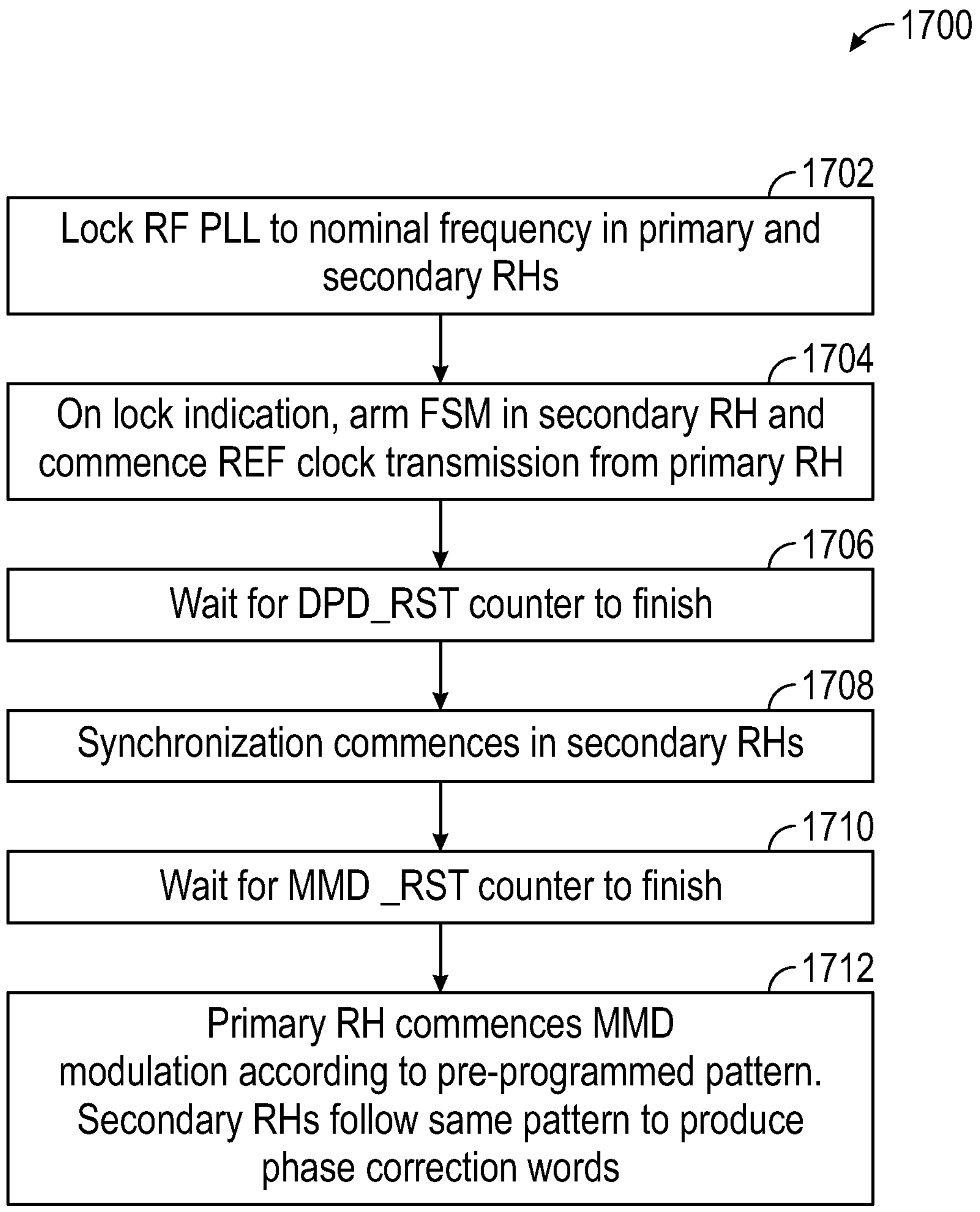
FIG. 17 illustrates a flow chart of a method such as may be provided by or programmed into a finite state machine (FSM) according to some aspects.

FIG. 16 illustrates a state transition diagram 1600 such as may be provided by or programmed into FSM 1016 (FIG. 10) according to some aspects. Reference to other elements of FIG. 10 is made when describing FIG. 16 below. FIG. 17 illustrates components of the state transition diagram 1600 in flowchart 1700 format.

Upon start-up, the FSM 1016 in both a primary and secondary RH reside in an IDLE state at 1602. As described earlier herein, more than one secondary RH may be present in a system. General purpose firmware can operate an RH to calibrate oscillator circuits (e.g., CLK PLL 1004 and RF PLL 1006), TDC 1022 or other circuitry and lock oscillator circuits to nominal frequency using, for example, nominal Frequency Control Words (FCWs) as seen for example in operation 1702 (FIG. 17). At this point the different oscillator circuits are operating differently and have not started passing clock information to each other.

Once lock indications have been received from all connected RHs, system timer and/or a user command is passed to both RHs, effectively asserting the synchronization enable (sync_en) bit to 1 as seen for example in operation 1704. In the primary RH, this bit releases the REF clock output $REF_O$, also causing the FSM 1016 to proceed to the next state. The appearance of either rising or falling edge on the reference output (1014) is denoted herein as a wakeup signal. In secondary RHs, assertion of the sync_bit to 1 puts the local FSM into an armed state. In the armed state, secondary RHs will use $REF_I$ input signal 1018 rather than the local PLL 1004 (FIG. 10). The arrival of a wakeup signal on this $REF_I$ input signal (1018) will cause successive transitions to the rest of the states (e.g., DPD-RST WAIT state 1604, MMD_RST WAIT 1606 or SYNC 1608) according to pre-programming of the FSMs in all the primary and secondary RHs.

Upon exiting IDLE state 1602, the FSM 1016 may spend a small, predefined number of cycles in a DPD-RST WAIT state 1604, (operation 1706 (FIG. 17) in which the DPD 1024 output is held at reset and DLF 1028 is not updated. This can allow the DLF 1028 to fill internal memories and prevent undesired transients.

Next, the system may begin tracking operation by entering MMD_RST WAIT state 1606 (operation 1708 (FIG. 17)). In some aspects, use of MMD 1012 modulation can be postponed for a predefined number of cycles to let Δf converge faster (see Equation (1)). Alternatively, following initial sync, the Δf value can be preserved (at least because Δf may be a slowly changing quantity), to facilitate convergence in the follow-on activations.

Finally, the MMD reset is removed (see also operation 1710 (FIG. 17)), and clock modulation can commence. The FSM 1016 moves to SYNC 1608, where the FSM 1016 may remain as long as synchronous operation is required. The primary RH can commence with MMD modulation (e.g., dithering) according to a pre-programmed pattern (see also operation 1712 (FIG. 17)). For example, the MMD modulation can begin by dividing by sequentially different multiple numbers (e.g., proceeding up or down from a nominal value, e.g., 16 in the previous example). Accordingly, the reference output 1014 (FIG. 10) is dithered and provided from the primary RH through block 1032 (FIG. 10) to one or more secondary RHs.

The FSM 1016 may be reset to IDLE state 1602 at any point by de-asserting the sync_en signal. The same dithering machine will operate in the secondary RH (or multiple secondary RHs), therefore causing the primary RH and one or more secondary RHs to operate from the same clock in the same state because all RHs have information regarding the dithering sequence and the MMD 1012 is operating based on the RF PLL 1006.

In some alternative aspects, the MMD operation trigger can be derived through measurement of a local oscillator (LO) clock number of cycles using a cycle counter. Once the number of cycles that has passed from the last measurement becomes different from a default number (e.g., 16 in the above example), the MMD operation can be triggered. Counter disambiguation (utilized here due to lack of lock between the LO and the REF clock signals) can be performed using TDC 1022 information.

In the above manner a secondary RH (or multiple secondary RHs) can produce the same output signal as is being produced by a primary RH while using fast dithering patterns to meet SNR specifications without surpassing EMI limits of a device. In some examples, each RH will include an identical FSM 1016 as described earlier herein. In other examples, dithering information can be stored in memory registers to be accessed by each RH.

Other Systems and Apparatuses

Figure 18:
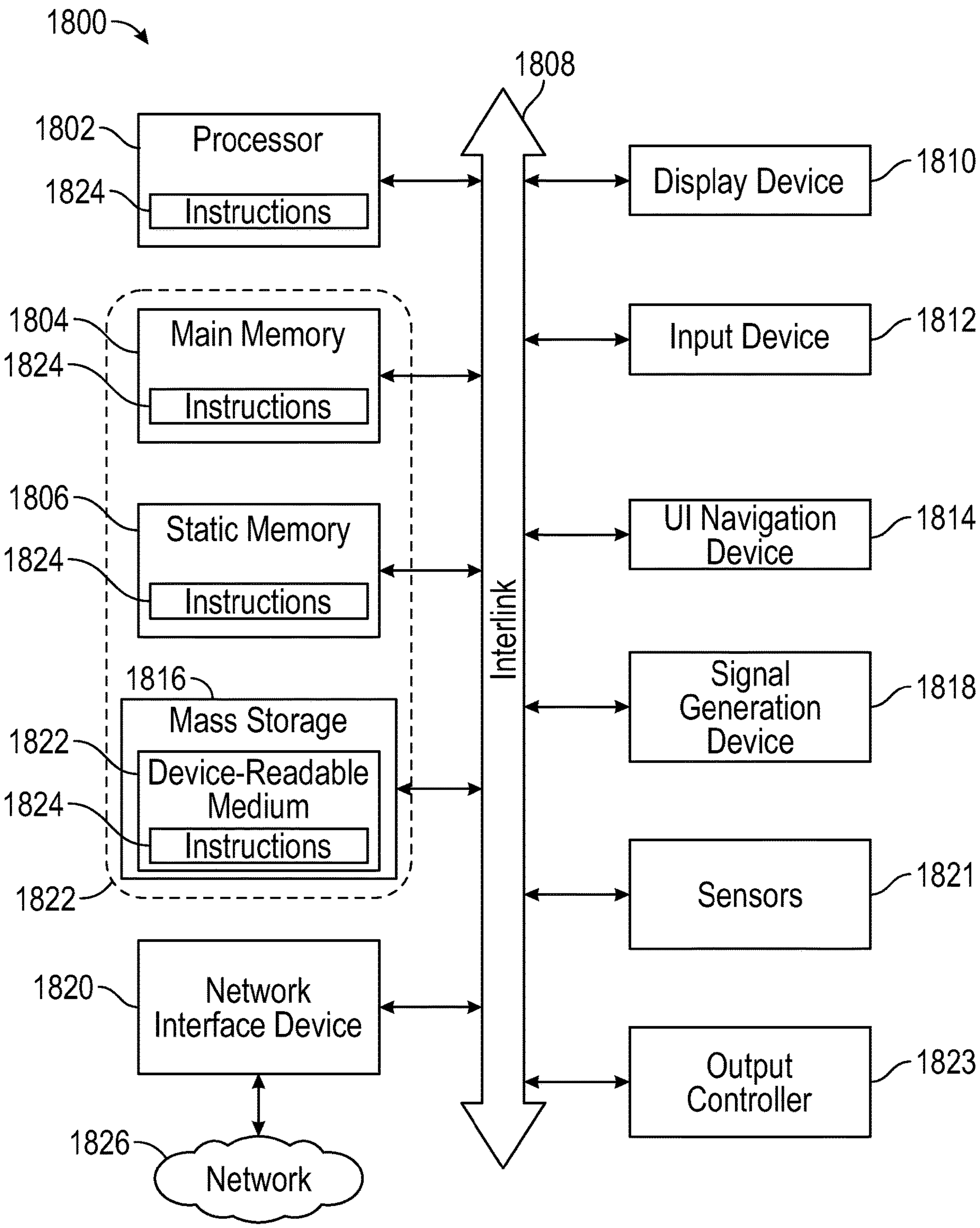
FIG. 18 illustrates a block diagram of a communication device such as an evolved Node-B (eNB), a new generation Node-B (gNB), an access point (AP), a wireless station (STA), a mobile station (MS), or a user equipment (UE), in accordance with some aspects.

FIG. 18 illustrates a block diagram of a communication device 1800 such as an evolved Node-B (eNB), a new generation Node-B (gNB), an access point (AP), a wireless station (STA), a mobile station (MS), or a user equipment (UE), in accordance with some aspects. In alternative aspects, the communication device 1800 may operate as a standalone device or may be connected (e.g., networked) to other communication devices. In some aspects, the communication device 1800 can use one or more of the techniques and circuits discussed herein, in connection with any of FIG. 1-FIG. 12B.

Circuitry (e.g., processing circuitry) is a collection of circuits implemented in tangible entities of the device 1800 that include hardware (e.g., simple circuits, gates, logic, etc.). Circuitry membership may be flexible over time. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a machine readable medium physically modified (e.g., magnetically, electrically, moveable placement of invariant massed particles, etc.) to encode instructions of the specific operation.

In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine readable medium elements are part of the circuitry or are communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the device 1800 follow.

In some aspects, the device 1800 may operate as a standalone device or may be connected (e.g., networked) to other devices. In a networked deployment, the communication device 1800 may operate in the capacity of a server communication device, a client communication device, or both in server-client network environments. In an example, the communication device 1800 may act as a peer communication device in peer-to-peer (P2P) (or other distributed) network environment. The communication device 1800 may be a UE, eNB, PC, a tablet PC, a STB, a PDA, a mobile telephone, a smart phone, a web appliance, a network router, switch or bridge, or any communication device capable of executing instructions (sequential or otherwise) that specify actions to be taken by that communication device. Further, while only a single communication device is illustrated, the term "communication device" shall also be taken to include any collection of communication devices that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a communication device-readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Communication device (e.g., UE) 1800 may include a hardware processor 1802 (e.g., a central processing unit (CPU), a graphics processing unit (GPU), a hardware processor core, or any combination thereof), a main memory 1804, a static memory 1806, and mass storage 1816 (e.g., hard drive, tape drive, flash storage, or other block or storage devices), some or all of which may communicate with each other via an interlink (e.g., bus) 1808.

The communication device 1800 may further include a display unit 1810, an alphanumeric input device 1812 (e.g., a keyboard), and a user interface (UI) navigation device 1814 (e.g., a mouse). In an example, the display unit 1810, input device 1812 and UI navigation device 1814 may be a touch screen display. The communication device 1800 may additionally include a signal generation device 1818 (e.g., a speaker), a network interface device 1820, and one or more sensors 1821, such as a global positioning system (GPS) sensor, compass, accelerometer, or other sensor. The communication device 1800 may include an output controller 1823, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The mass storage 1816 may include a communication device-readable medium 1822, on which is stored one or more sets of data structures or instructions 1824 (e.g., software) embodying or utilized by any one or more of the techniques or functions described herein. In some aspects, registers of the processor 1802, the main memory 1804, the static memory 1806, and/or the mass storage 1816 may be, or include (completely or at least partially), the device-readable medium 1822, on which is stored the one or more sets of data structures or instructions 1824, embodying or utilized by any one or more of the techniques or functions described herein. In an example, one or any combination of the hardware processor 1802, the main memory 1804, the static memory 1806, or the mass storage 1816 may constitute the device-readable medium 1822.

As used herein, the term "device-readable medium" is interchangeable with "computer-readable medium" or "machine-readable medium". While the communication device-readable medium 1822 is illustrated as a single medium, the term "communication device-readable medium" may include a single medium or multiple media (e.g., a centralized or distributed database, and/or associated caches and servers) configured to store the one or more instructions 1824.

The term "communication device-readable medium" may include any medium that is capable of storing, encoding, or carrying instructions for execution by the communication device 1800 and that cause the communication device 1800 to perform any one or more of the techniques of the present disclosure, or that is capable of storing, encoding or carrying data structures used by or associated with such instructions. Non-limiting communication device-readable medium examples may include solid-state memories, and optical and magnetic media. Specific examples of communication device-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, communication device-readable media may include non-transitory communication device-readable media. In some examples, communication device-readable media may include communication device-readable media that is not a transitory propagating signal.

The instructions 1824 may further be transmitted or received over a communications network 1826 using a transmission medium via the network interface device 1820 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 1820 may include one or more physical jacks (e.g., Ethernet, coaxial, or phone jacks) or one or more antennas to connect to the communications network 1826. In an example, the network interface device 1820 may include a plurality of antennas to wirelessly communicate using at least one of single-input multiple-output (SIMO), MIMO, or multiple-input single-output (MISO) techniques. In some examples, the network interface device 1820 may wirelessly communicate using Multiple User MIMO techniques.

The term "transmission medium" shall be taken to include any intangible medium that is capable of storing, encoding, or carrying instructions for execution by the communication device 1800, and includes digital or analog communications signals or other intangible medium to facilitate communication of such software. In this regard, a transmission medium in the context of this disclosure is a device-readable medium.

Figure 19:
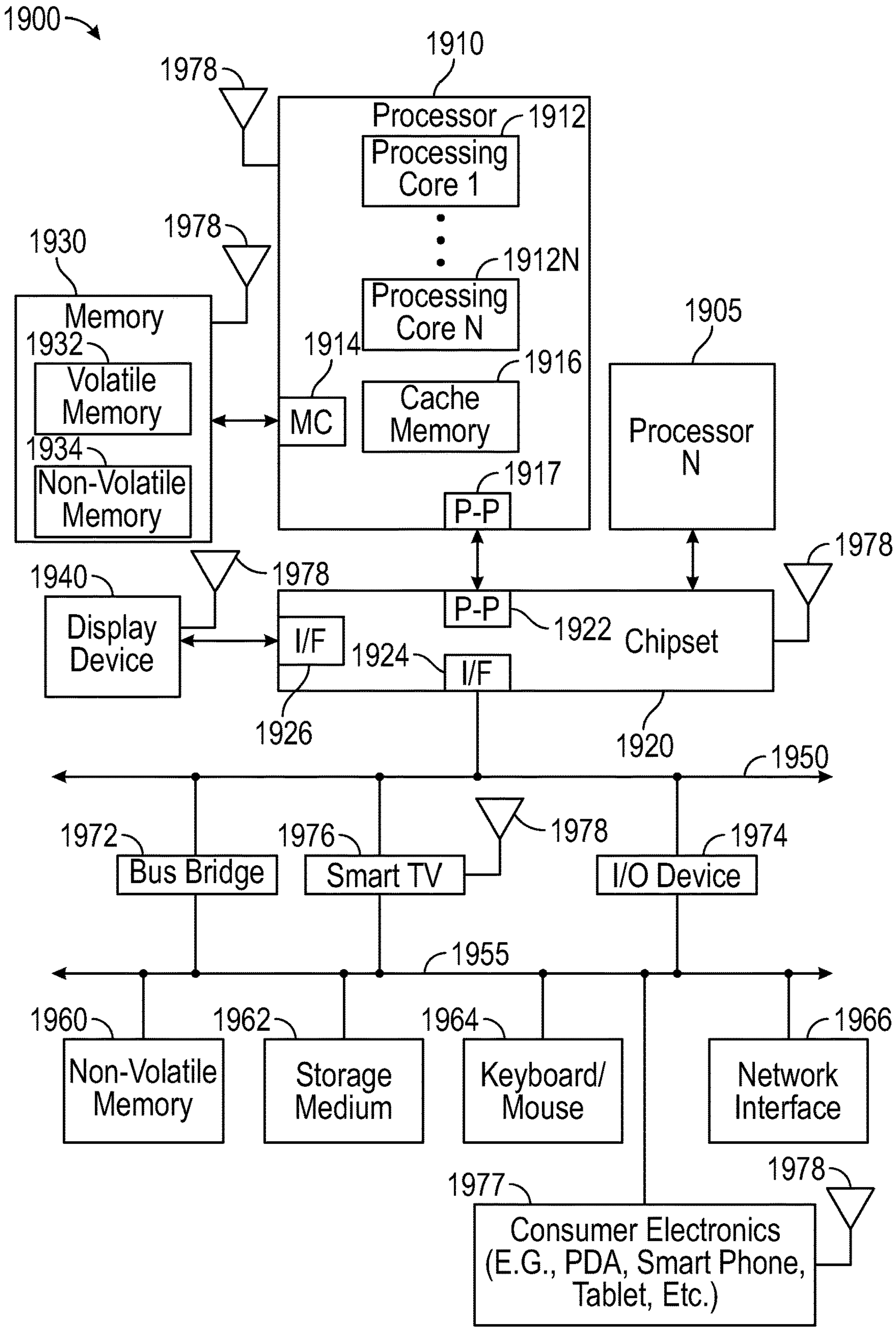
FIG. 19 illustrates a system level diagram, depicting an example of an electronic device (e.g., system) that can include, for example, a transmitter configured to selectively fan out a signal to one of multiple communication channels.

FIG. 19 illustrates a system level diagram, depicting an example of an electronic device (e.g., system) that can include, for example, a transmitter configured to selectively fan out a signal to one of multiple communication channels. FIG. 19 is included to show an example of a higher-level device application for the subject matter discussed above with regards to FIGS. 1-18. In one aspect, system 1900 includes, but is not limited to, a desktop computer, a laptop computer, a netbook, a tablet, a notebook computer, a personal digital assistant (PDA), a server, a workstation, a cellular telephone, a mobile computing device, a smart phone, an Internet appliance, or any other type of computing device. In some aspects, system 1900 is a system on a chip (SOC) system.

In one aspect, processor 1910 has one or more processor cores 1912, . . . , 1912N, where 1912N represents the Nth processor core inside processor 1910 where N is a positive integer. In one aspect, system 1900 includes multiple processors including 1910 and 1905, where processor 1905 has logic similar or identical to the logic of processor 1910. In some aspects, processing core 1912 includes, but is not limited to, pre-fetch logic to fetch instructions, decode logic to decode the instructions, execution logic to execute instructions and the like. In some aspects, processor 1910 has a cache memory 1916 to cache instructions and/or data for system 1900. Cache memory 1916 may be organized into a hierarchal structure including one or more levels of cache memory.

In some aspects, processor 1910 includes a memory controller 1914, which is operable to perform functions that enable the processor 1910 to access and communicate with memory 1930 that includes a volatile memory 1932 and/or a non-volatile memory 1934. In some aspects, processor 1910 is coupled with memory 1930 and chipset 1920. Processor 1910 may also be coupled to a wireless antenna 1978 to communicate with any device configured to transmit and/or receive wireless signals. In one aspect, an interface for wireless antenna 1978 operates in accordance with, but is not limited to, the IEEE 802.11 standard and its related family, Home Plug AV (HPAV), Ultra Wide Band (UWB), Bluetooth, WiMax, or any form of wireless communication protocol.

In some aspects, volatile memory 1932 includes, but is not limited to, Synchronous Dynamic Random Access Memory (SDRAM), Dynamic Random Access Memory (DRAM), RAMBUS Dynamic Random Access Memory (RDRAM), and/or any other type of random access memory device. Non-volatile memory 1934 includes, but is not limited to, flash memory, phase change memory (PCM), read-only memory (ROM), electrically erasable programmable read-only memory (EEPROM), or any other type of non-volatile memory device.

Memory 1930 stores information and instructions to be executed by processor 1910. In one aspect, memory 1930 may also store temporary variables or other intermediate information while processor 1910 is executing instructions. In the illustrated aspect, chipset 1920 connects with processor 1910 via Point-to-Point (PtP or P-P) interfaces 1917 and 1922. Chipset 1920 enables processor 1910 to connect to other elements in system 1900. In some aspects of the example system, interfaces 1917 and 1922 operate in accordance with a PtP communication protocol such as the Intel® QuickPath Interconnect (QPI) or the like. In other aspects, a different interconnect may be used.

In some aspects, chipset 1920 is operable to communicate with processor 1910, 1905, display device 1940, and other devices, including a bus bridge 1972, a smart TV 1976, I/O devices 1974, nonvolatile memory 1960, a storage medium (such as one or more mass storage devices) 1962, a keyboard/mouse 1964, a network interface 1966, and various forms of consumer electronics 1977 (such as a PDA, smart phone, tablet etc.), etc. In one aspect, chipset 1920 couples with these devices through an interface 1924. Chipset 1920 may also be coupled to a wireless antenna 1978 to communicate with any device configured to transmit and/or receive wireless signals.

Chipset 1920 connects to display device 1940 via interface 1926. Display device 1940 may be, for example, a liquid crystal display (LCD), a plasma display, cathode ray tube (CRT) display, or any other form of visual display device. In some aspects of the example system, processor 1910 and chipset 1920 are merged into a single SOC. In addition, chipset 1920 connects to one or more buses 1950 and 1955 that interconnect various system elements, such as I/O devices 1974, nonvolatile memory 1960, storage medium 1962, a keyboard/mouse 1964, and network interface 1966. Buses 1950 and 1955 may be interconnected together via a bus bridge 1972.

In one aspect, storage medium 1962 includes, but is not limited to, a solid-state drive, a hard disk drive, a universal serial bus flash memory drive, or any other form of computer data storage medium. In one aspect, network interface 1966 is implemented by any type of well-known network interface standard including, but not limited to, an Ethernet interface, a universal serial bus (USB) interface, a Peripheral Component Interconnect (PCI) Express interface, a wireless interface and/or any other suitable type of interface. In one aspect, the wireless interface operates in accordance with, but is not limited to, the IEEE 802.11 standard and its related family, Home Plug AV (HPAV), Ultra Wide Band (UWB), Bluetooth, WiMax, or any form of wireless communication protocol.

While the modules shown in FIG. 19 are depicted as separate blocks within the system 1900, the functions performed by some of these blocks may be integrated within a single semiconductor circuit or may be implemented using two or more separate integrated circuits. For example, although cache memory 1916 is depicted as a separate block within processor 1910, cache memory 1916 (or selected aspects of 1916) can be incorporated into processor core 1912.

Discussions herein utilizing terms such as, for example, “processing”, “computing”, “calculating”, “determining”, “establishing”, “analyzing”, “checking”, or the like, may refer to operation(s) and/or process(es) of a computer, a computing platform, a computing system, or other electronic computing device, that manipulate and/or transform data represented as physical (e.g., electronic) quantities within the computer’s registers and/or memories into other data similarly represented as physical quantities within the computer’s registers and/or memories or other information storage medium that may store instructions to perform operations and/or processes.

The terms “plurality” and “a plurality”, as used herein, include, for example, “multiple” or “two or more”. For example, “a plurality of items” includes two or more items.

References to “one aspect”, “an aspect”, “an example aspect”, “some aspects”, “demonstrative aspect”, “various aspects” etc., indicate that the aspect(s) so described may include a particular feature, structure, or characteristic, but not every aspect necessarily includes the particular feature, structure, or characteristic. Further, repeated use of the phrase “in one aspect” does not necessarily refer to the same aspect, although it may.

As used herein, unless otherwise specified the use of the ordinal adjectives “first”, “second”, “third” etc., to describe a common object, merely indicate that different instances of like objects are being referred to and are not intended to imply that the objects so described must be in a given sequence, either temporally, spatially, in ranking, or in any other manner.

Some aspects may be used in conjunction with various devices and systems, for example, a User Equipment (UE), a Mobile Device (MD), a wireless station (STA), a Personal Computer (PC), a desktop computer, a mobile computer, a laptop computer, a notebook computer, a tablet computer, a server computer, a handheld computer, a sensor device, an Internet of Things (IoT) device, a wearable device, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some aspects may, for example, be used in conjunction with devices and/or networks operating in accordance with existing IEEE 802.11 standards (including IEEE 802.11-2016 (IEEE 802.11-2016, IEEE Standard for Information technology-Telecommunications and information exchange between systems Local and metropolitan area networks—Specific requirements Part 11: Wireless LAN Medium Access Control (MAC) and Physical Layer (PHY) Specifications, Dec. 7, 2016); IEEE 802.11ay (P802.11ay Standard for Information Technology-Telecommunications and Information Exchange Between Systems Local and Metropolitan Area Networks—Specific Requirements Part 11: Wireless LAN Medium Access Control (MAC) and Physical Layer (PHY) Specifications—Amendment: Enhanced Throughput for Operation in License-Exempt Bands Above 45 GHz)) and/or future versions and/or derivatives thereof, devices and/or networks operating in accordance with existing WiFi Alliance (WFA) Peer-to-Peer (P2P) specifications (including WiFi P2P technical specification, version 1.5, Aug. 4, 2015) and/or future versions and/or derivatives thereof, devices and/or networks operating in accordance with existing Wireless-Gigabit-Alliance (WGA) specifications (including Wireless Gigabit Alliance, Inc WiGig MAC and PHY Specification Version 1.1, April 2011, Final specification) and/or future versions and/or derivatives thereof, devices and/or networks operating in accordance with existing cellular specifications and/or protocols, e.g., 3rd Generation Partnership Project (3GPP), 3GPP Long Term Evolution (LTE) and/or future versions and/or derivatives thereof, units and/or devices which are part of the above networks, and the like.

Some aspects may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some aspects may be used in conjunction with one or more types of wireless communication signals and/or systems, for example, Radio Frequency (RF), Infra-Red (IR), Frequency-Division Multiplexing (FDM), Orthogonal FDM (OFDM), Orthogonal Frequency-Division Multiple Access (OFDMA), Spatial Divisional Multiple Access (SDMA), FDM Time-Division Multiplexing (TDM), Time-Division Multiple Access (TDMA), Multi-User MIMO (MU-MIMO), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G) mobile networks, 3GPP, Long Term Evolution (LTE), LTE advanced, Enhanced Data rates for GSM Evolution (EDGE), or the like. Other aspects may be used in various other devices, systems and/or networks.

The term “wireless device”, as used herein, includes, for example, a device capable of wireless communication, a communication device capable of wireless communication, a communication station capable of wireless communication, a portable or non-portable device capable of wireless communication, or the like. In some demonstrative aspects, a wireless device may be or may include a peripheral that is integrated with a computer, or a peripheral that is attached to a computer. In some demonstrative aspects, the term “wireless device” may optionally include a wireless service.

The term “communicating” as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting and/or the action of receiving. In one example, the phrase “communicating a signal” may refer to the action of transmitting the signal by a first device and may not necessarily include the action of receiving the signal by a second device. In another example, the phrase “communicating a signal” may refer to the action of receiving the signal by a first device and may not necessarily include the action of transmitting the signal by a second device.

Some demonstrative aspects may be used in conjunction with a wireless communication network communicating over a frequency band above 45 Gigahertz (GHz), e.g., 60 GHz. However, other aspects may be implemented utilizing any other suitable wireless communication frequency bands, for example, an Extremely High Frequency (EHF) band (the millimeter wave (mmWave) frequency band), e.g., a frequency band within the frequency band of between 20 GHz and 300 GHz, a frequency band above 45 GHz, a frequency band below 20 GHz, e.g., a Sub 1 GHz (S1G) band, a 2.4 GHz band, a 5 GHz band, a WLAN frequency band, a WPAN frequency band, a frequency band according to the WGA specification, and the like.

As used herein, the term “circuitry” may, for example, refer to, be part of, or include, an Application Specific Integrated Circuit (ASIC), an integrated circuit, an electronic circuit, a processor (shared, dedicated, or group), and/or memory (shared, dedicated, or group), that execute one or more software or firmware programs, a combinational logic circuit, and/or other suitable hardware components that provide the described functionality. In some aspects, circuitry may include logic, at least partially operable in hardware. In some aspects, the circuitry may be implemented as part of and/or in the form of a radio virtual machine (RVM), for example, as part of a Radio processor (RP) configured to execute code to configured one or more operations and/or functionalities of one or more radio components.

The term “logic” may refer, for example, to computing logic embedded in circuitry of a computing apparatus and/or computing logic stored in a memory of a computing apparatus. For example, the logic may be accessible by a processor of the computing apparatus to execute the computing logic to perform computing functions and/or operations. In one example, logic may be embedded in various types of memory and/or firmware, e.g., silicon blocks of various chips and/or processors. Logic may be included in, and/or implemented as part of, various circuitry, e.g., radio circuitry, receiver circuitry, control circuitry, transmitter circuitry, transceiver circuitry, processor circuitry, and/or the like. In one example, logic may be embedded in volatile memory and/or non-volatile memory, including random access memory, read only memory, programmable memory, magnetic memory, flash memory, persistent memory, and/or the like. Logic may be executed by one or more processors using memory, e.g., registers, buffers, stacks, and the like, coupled to the one or more processors, e.g., as necessary to execute the logic.

The term “antenna” or “antenna array”, as used herein, may include any suitable configuration, structure and/or arrangement of one or more antenna elements, components, units, assemblies and/or arrays. In some aspects, the antenna may implement transmit and receive functionalities using separate transmit and receive antenna elements. In some aspects, the antenna may implement transmit and receive functionalities using common and/or integrated transmit/receive elements. The antenna may include, for example, a phased array antenna, a single element antenna, a set of switched beam antennas, and/or the like.

Additional Notes and Aspects

Example 1 is a radio-head (RH) apparatus comprising: memory to store dithering information of the apparatus; and RH circuitry configured to: generate a clock signal according to the dithering information; and provide a wakeup signal, subsequent to commencement of clock signal generation, to instruct additional RHs to use the clock signal of the RH apparatus.

Example 2 includes the subject matter of Example 1 and optionally wherein the RH circuitry further comprises divider circuitry, and wherein the RH circuitry is configured to apply modulation to the clock signal using the divider circuitry.

Example 3 includes the subject matter of any of Examples 1-2 and optionally wherein the dithering information includes information on divisors used in the divider circuitry.

Example 4 includes the subject matter of any of Examples 1-3 and optionally further comprising finite state machine (FSM) circuitry, and wherein the FSM circuitry is initiated by a system timer and/or a user command.

Example 5 is a radio-head (RH) apparatus comprising: memory to store dithering information of the apparatus; a radio frequency (RF) transmitter configured to output a modulated local oscillator (LO) signal; phase measurement circuitry configured to measure phase of the LO signal relative to a clock signal; and RH circuitry configured to: responsive to receiving a wakeup signal, synchronize a clock signal of the apparatus with an externally provided clock signal; use the externally provided clock signal to measure the phase of the LO signal; compensate the measurements of the phase of the LO signal based on the dithering information; and apply the compensated measurements to correct phase of the RF transmitter output.

Example 6 includes the subject matter of claim 5 and optionally wherein the externally provided clock is generated by a primary RH separate from the RH apparatus.

Example 7 includes the subject matter of any of claims 5-6 and optionally wherein the RH circuitry further comprises finite state machine circuitry (FSM) to synchronize the compensation information with the dithering information applied in the primary RH.

Example 8 includes the subject matter of Example 7 and optionally wherein the compensation information is based on an instantaneous output of filter circuitry and on a modulation shift.

Example 9 includes the subject matter of Example 8 and optionally wherein the modulation shift is based on the dithering information.

Example 10 includes the subject matter of Example 9 and optionally wherein the dithering information includes divisor information for divider circuitry of the apparatus.

Example 11 includes the subject matter of Example 10 and optionally wherein the dithering information includes same dithering information as provided in the primary RH.

Example 12 includes the subject matter of any of Examples 5-11 and optionally further comprising a local reference clock to enable calibration of the phase measurement circuitry.

Example 13 is a system comprising base-band sub-system (BBSS) coupled at least two radio-head (RH) apparatuses, the at least two RH apparatuses including a primary RH and at least one secondary RH, the BBSS comprising: primary RH circuitry configured to: generate a clock signal according to dithering information of the system; and provide a wakeup signal, subsequent to commencement of clock signal generation, to instruct the secondary RH to use the clock signal of the primary RH; and at least one secondary RH circuitry configured to use the clock signal of the primary RH subsequent to detecting the wakeup signal.

In Example 14, the subject matter of Example 13 can optionally include divider circuitry and wherein the dithering information includes information on divisors used in the divider circuitry.

In Example 15, the subject matter of any of Examples 13-14 can optionally include wherein the primary RH circuitry and the secondary RH circuitry further comprise finite state machine (FSM) circuitry configured to govern and report application of divisors in the divider circuitry.

In Example 16, the subject matter of Example 15 can optionally include wherein the FSM circuitry of the primary RH circuitry is initiated by a system timer and/or a user command.

In Example 17, the subject matter of Example 16 can optionally include wherein the FSM circuitry of the secondary RH is configured to enter into armed mode by a system timer and/or a user command and to initiate FSM circuitry of the secondary RH upon detection of a wake-up signal generated by the primary RH.

In Example 18, the subject matter of Example 17 can optionally include wherein the secondary RH is configured to generate a compensation information derived from the clock signal of the primary RH.

In Example 19, the subject matter of Example 18 can optionally include wherein the compensation information is based on an instantaneous output of filter circuitry of the secondary RH and on a modulation shift.

In Example 20, the subject matter of Example 19 can optionally include wherein the modulation shift is based on the dithering information, and wherein the dithering information includes divisor information for divider circuitry of the system as reported by the FSM of a secondary RH.

The above detailed description includes references to the accompanying drawings, which form a part of the detailed description. The drawings show, by way of illustration, specific aspects in which the invention can be practiced. These aspects are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other aspects can be used, such as by one of ordinary skill in the art upon reviewing the above description. The Abstract is provided to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed aspect. Thus, the following claims are hereby incorporated into the Detailed Description, with each claim standing on its own as a separate aspect, and it is contemplated that such aspects can be combined with each other in various combinations or permutations. The scope of the invention should be determined with reference to the appended claims, along with the full scope of equivalents to which such claims are legally entitled.

What is claimed is:

1. A radio-head (RH) apparatus comprising:

memory to store dithering information of the apparatus; and

RH circuitry configured to:

generate a clock signal according to the dithering information; and provide a wakeup signal, subsequent to commencement of clock signal generation, to instruct additional RHs to use the clock signal of the RH apparatus.

2. The RH apparatus of claim 1, wherein the RH circuitry further comprises divider circuitry, and wherein the RH circuitry is configured to apply modulation to the clock signal using the divider circuitry.

3. The RH apparatus of claim 2, wherein the dithering information includes information on divisors used in the divider circuitry.

4. The RH apparatus of claim 2, further comprising finite state machine (FSM) circuitry, and wherein the FSM circuitry is initiated by a system timer and/or a user command.

5. A radio-head (RH) apparatus comprising:

memory to store dithering information of the apparatus;

a radio frequency (RF) transmitter configured to output a modulated local oscillator (LO) signal;

phase measurement circuitry configured to measure phase of the LO signal relative to a clock signal; and RH circuitry configured to:

responsive to receiving a wakeup signal, synchronize a clock signal of the apparatus with an externally provided clock signal;

use the externally provided clock signal to measure the phase of the LO signal;

compensate the measurements of the phase of the LO signal based on the dithering information; and apply the compensated measurements to correct phase of the RF transmitter output.

6. The RH apparatus of claim 5, wherein the externally provided clock is generated by a primary RH separate from the RH apparatus.

7. The RH apparatus of claim 6, wherein the RH circuitry further comprises finite state machine circuitry (FSM) to synchronize compensation information with the dithering information applied in the primary RH.

8. The RH apparatus of claim 7, wherein the compensation information is based on an instantaneous output of filter circuitry and on a modulation shift.

9. The RH apparatus of claim 8, wherein the modulation shift is based on the dithering information.

10. The RH apparatus of claim 9, wherein the dithering information includes divisor information for divider circuitry of the apparatus.

11. The RH apparatus of claim 10, wherein the dithering information includes same dithering information as provided in the primary RH.

12. The RH apparatus of claim 5, further comprising a local reference clock to enable calibration of the phase measurement circuitry.

13. A system comprising:

a base-band sub-system (BBSS) coupled at least two radio-head (RH) apparatuses, the at least two RH apparatuses including a primary RH and at least one secondary RH, the BBSS comprising:

primary RH circuitry configured to:

generate a clock signal according to dithering information of the system; and provide a wakeup signal, subsequent to commencement of clock signal generation, to instruct the secondary RH to use the clock signal of the primary RH; and at least one secondary RH circuitry configured to use the clock signal of the primary RH subsequent to detecting the wakeup signal.

14. The system of claim 13, further comprising divider circuitry and wherein the dithering information includes information on divisors used in the divider circuitry.

15. The system of claim 14, wherein the primary RH circuitry and the secondary RH circuitry further comprise finite state machine (FSM) circuitry configured to govern and report application of divisors in the divider circuitry.

16. The system of claim 15, wherein the FSM circuitry of the primary RH circuitry is initiated by a system timer and/or a user command.

17. The system of claim 16, wherein the FSM circuitry of the secondary RH is configured to enter into armed mode by a system timer and/or a user command and to initiate FSM circuitry of the secondary RH upon detection of a wake-up signal generated by the primary RH.

18. The system of claim 17, wherein the secondary RH is configured to generate compensation information derived from the clock signal of the primary RH.

19. The system of claim 18, wherein the compensation information is based on an instantaneous output of filter circuitry of the secondary RH and on a modulation shift.

20. The system of claim 19, wherein the modulation shift is based on the dithering information, and wherein the dithering information includes divisor information for divider circuitry of the system as reported by the FSM of a secondary RH.

* * * * *